(12) United States Patent
Pergerson

(10) Patent No.: US 12,304,729 B2
(45) Date of Patent: May 20, 2025

(54) SIZE REDUCTION AND STORAGE DEVICE SYSTEM AND METHOD OF USE

(71) Applicant: Joel Pergerson, Appomattox, VA (US)

(72) Inventor: Joel Pergerson, Appomattox, VA (US)

( * ) Notice: Subject to any disclaimer, the term of this patent is extended or adjusted under 35 U.S.C. 154(b) by 227 days.

(21) Appl. No.: 18/082,423

(22) Filed: Dec. 15, 2022

(65) Prior Publication Data
US 2023/0122758 A1 Apr. 20, 2023

Related U.S. Application Data

(63) Continuation-in-part of application No. 16/913,915, filed on Jun. 26, 2020, now abandoned.

(51) Int. Cl.
| | |
|---|---|
| *B65F 1/14* | (2006.01) |
| *B33Y 10/00* | (2015.01) |
| *B33Y 30/00* | (2015.01) |
| *B33Y 50/02* | (2015.01) |

(52) U.S. Cl.
CPC ............ *B65F 1/1426* (2013.01); *B33Y 10/00* (2014.12); *B33Y 30/00* (2014.12); *B33Y 50/02* (2014.12); *B65F 2210/138* (2013.01); *B65F 2210/169* (2013.01)

(58) Field of Classification Search
CPC ......... B29C 64/10; B29C 64/20; B29C 64/30; C12M 1/00
USPC .......................... 241/101.2; 435/290.1–290.4
See application file for complete search history.

(56) References Cited

U.S. PATENT DOCUMENTS

| | | | |
|---|---|---|---|
| 7,520,457 B1 * | 4/2009 | Poitras .................. | C05F 17/929 241/101.2 |
| 10,307,970 B2 * | 6/2019 | Snyder .................. | B29C 64/321 |
| 2009/0008298 A1 * | 1/2009 | Studley .................... | F23G 5/006 15/1 |
| 2011/0151553 A1 * | 6/2011 | Cruson .................. | C05F 17/907 435/290.2 |
| 2021/0213680 A1 * | 7/2021 | Gomez Fernandez ...................... | B33Y 30/00 |
| 2021/0308937 A1 * | 10/2021 | Broach ................. | B29C 64/329 |
| 2021/0394398 A1 * | 12/2021 | Lidwell ............... | B29B 17/0042 |
| 2024/0124676 A1 * | 4/2024 | Korey .................... | B33Y 70/10 |

* cited by examiner

*Primary Examiner* — Nahida Sultana
(74) *Attorney, Agent, or Firm* — Richard Eldredge; Leavitt Eldredge Law Firm

(57) ABSTRACT

A novel material size reducing and storage device system comprising of a composting system and a three-dimensional (3D) printing system is disclosed. The compost system is configured to facilitate material size reduction of compostable material. The 3D printing system is configured to facilitate 3D printing of one or more objects using material that have been reduced to a predetermined size.

2 Claims, 20 Drawing Sheets

SIZE REDUCTION AND STORAGE DEVICE SYSTEM AND METHOD OF USE

CROSS REFERENCE TO RELATED APPLICATIONS

This application is a continuation of U.S. application Ser. No. 16/913,935 filed on Jun. 26, 2020, of which is hereby incorporated by reference in its entirety.

BACKGROUND

1. Field of the Invention

The present invention relates generally to size reduction and storage devices. More specifically, the present invention relates to a novel size reduction and storage device system that can detect material type, reduce said material to predetermined size(s), wash said material to remove contaminants, and store said material to be later transferred to a recycling facility.

2. Description of Related Art

The recycling industry is reeling from the 2018 China announcement that it would no longer receive recyclables with contamination of 0.5% or higher. For China to receive recyclables, the material must be 99.5% pure. Recycling facilities' current processes, along with consumer participation, make it nearly impossible to meet that standard with current contamination rates between 25% and 30%. This high rate greatly increases processing costs.

The problem, from the consumer standpoint, is that recycling is confusing and difficult. This fact is reflected in over 90% of Americans support recycling, yet less than 35% of Americans recycle.

There are seven classifications of recyclable plastics, four classifications of recyclable paper, and thirteen types of recyclable scrap metal. Most recycling centers do not accept plastic bags and only receive Plastic #1—PETE (Polyethylene Terephthalate) and Plastic #2—HDPE (High Density Polyethylene) of recyclable plastics, generally in bottle form only. What is and is not accepted by recycling centers is confusing to many consumers. The natural default for the consumer becomes throwing good recyclables into the trash because it is easier. Additionally, many consumers must go out of the way to turn in their recyclables. This inconvenience often translates into potential recyclables becoming waste in landfills.

Recycling centers have attempted different types of programs to encourage consumers to recycle. Curbside recycling programs are offered in most communities, but due to lack of education, many households think that items like bowling balls, garden hoses and batteries should go into the recycling bins. Although the participation is welcomed, these acts lead to costly fixes and high levels of recycling material contamination.

There has been very little innovation in the collection of recyclables. Some companies have offered corrugated boxes for consumers to fill and mail back at the consumer's expense. These types of services have low participation due to inconvenience and high shipping costs. Another method of attempting to boost involvement is utilizing a single receptacle coupled with a discount incentive program. Although liked by the few who recycled this way, due to the small number of units serving a large geographic area, this method has virtually no traction.

For most consumers and businesses, the current recycling programs, methods, and systems are difficult to participate in. A simpler approach that is in line with normal everyday habits is required to have a successful recycling program.

Accordingly, although great strides have been made in the area of size reduction and storage device systems, many shortcomings remain.

Therefore, a need exists in the field for a novel size reduction and storage device systems capable of recycling all seven classifications of plastics, four classifications of recyclable paper, and multiple types of recyclable metals by reducing the material size of the recyclable and thus allowing uncontaminated material to be stored in less space. A further need exits for a size reduction and storage device that incorporates SMART (Self-Monitoring Analysis and Reporting Technology) technology to create an intuitive, proactive communication module within the recycling device to increase user usage and buy-in. Finally, there is also a need for a size reduction and storage device to be simple to use and seamlessly integrated into our everyday lifestyle.

BRIEF SUMMARY OF THE INVENTION

The present invention comprises a novel size reduction and storage device system generally consisting of at least one material size reducing unit which is capable of shredding, grinding, cutting or use other similar methods for the purpose of recycling plastic, metal, paper, glass, and other materials. A storage unit, an apparatus that analyzes and detects plastic types, a computer system, and a cleaning system are part of the preferred embodiments.

Accordingly, in one embodiment, the present disclosure provides for the methodology of a novel size reduction and storage device system, wherein an item is placed within the size reduction and storage device to be shredded and later transferred to a recycling facility. For example, the process may involve the following steps:

a) scanning the item to verify the type of recyclable;
b) shredding the item into smaller pieces;
c) moving the shredded item into an assigned storage chamber;
d) washing the shredded item to remove any contamination;
e) moving the washed shredded item into the heating system;
f) prompting the user to transfer the shredded contents of the storage chamber or the heating system into a shipping package;
g) the user scanning the shipping package to track the transportation history of the shredded contents and to see what the shredded contents are upcycled into; and
h) the user mailing or using curbside service to transport the shredded contents within the shipping package to a recycling facility.

In one embodiment, the present disclosure provides for the methodology of a novel size reduction and storage device system, wherein an item is placed within the size reduction and storage device to be shredded and later transferred to a recycling facility. For example, the process may involve the following steps:

a) scanning the item to verify the type of recyclable;
b) depositing the item into a corresponding receiving port;
c) closing and locking the corresponding receiving port;
d) shredding the item into smaller pieces;
e) moving the shredded item into a holding tank;

f) washing the shredded item to remove any contamination within the holding tank;

g) prompting the user to transfer the washed shredded item from the holding tank into a tanker truck;

h) transporting the washed shredded item to a recycling facility; and i) communicating with the user of the status of the washed shredded item.

These and other aspects of the invention will be apparent upon reference to the following detailed description.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
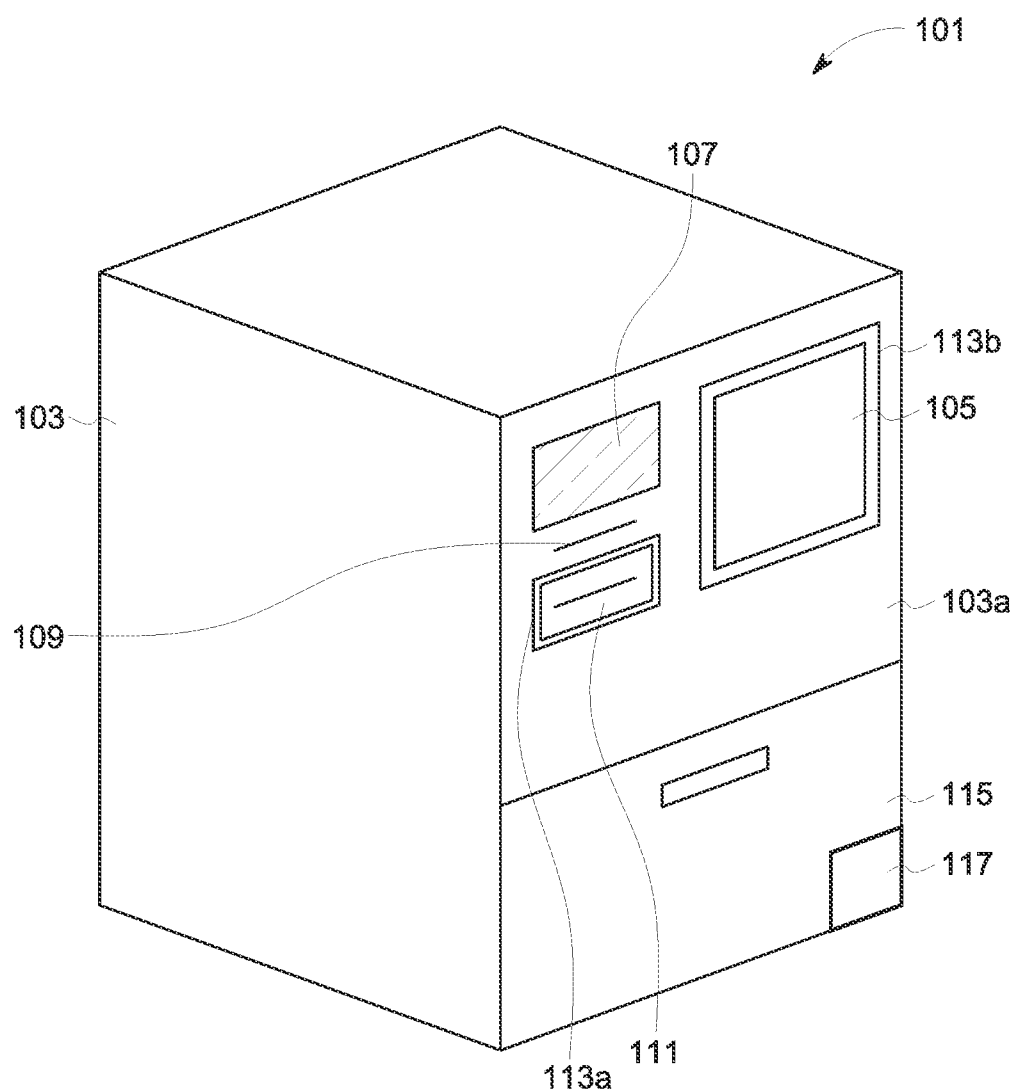
FIG. 1 is a perspective view of a size reduction and storage device system in accordance with a preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The terminology used herein is for the purpose of describing particular embodiments only and is not intended to be limiting of the invention. As used herein, the term "and/or" includes any and all combinations of one or more of the associated listed items. As used herein, the singular forms "a," "and," and "the" are intended to be included in the plural forms as well as the singular forms, unless the context clearly indicates otherwise. It will be further understood that the terms "comprises" and/or "comprising," when used direction in this specification, specifically the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are clearly within the scope of the invention and the claims.

The system and method of use in accordance with the present application overcomes one or more of the above-discussed problems commonly associated with conventional size reduction and storage device systems. Specifically, the system of the present invention incentives consumers to recycle at their convenience as well as preps items to be recyclable ready in downstream recycling facilities. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a perspective view of a size reduction and storage device system 101 in accordance with a preferred embodiment of the present invention. It will be appreciated that system 101 overcomes one or more of the above-listed problems commonly associated with conventional size reduction and storage device systems.

In the contemplated embodiment, system 101 includes a housing unit 103 incorporating an access door 105, one or more display units 107 (e.g., a liquid crystal display (LCD) cathode ray tube (CRT), etc.), a scanner 109, an entryway of a size reduction unit for flexible material 111, one or more light emitting diodes (LEDs) 113, a storage drawer 115, a second access door 117, and the front portion of a printer 119. In a preferred embodiment, the access door 105, the one or more display units 107, the scanner 109, the size reduction unit for flexible material 111, the one or more LEDs 113, for instance LED 113a and LED 113b, the storage drawer 115, and the second access door 117 are oriented in the front portion of the housing unit 103a.

The display unit 107 broadcasts a textual message, a graphical message, or a combination thereof to communicate with a user as well as receiving input information from the user. It is contemplated and will be appreciated that the display unit 107 may incorporate touch screen technology, a microphone and a speaker to further facilitate communication with the user.

It is also contemplated and will be appreciated that the size reduction unit for flexible material 111 takes in and shreds items including, but not limited to, clear food packaging, produce bags, garbage bags, shrink wrap, plastic wrap, and film wrap.

It is also contemplated and will be appreciated that the access door 105 and the second access door 117 incorporates manual means, automation technology, or a combination thereof to facilitate opening and closing. The second access door 117 allows for easier access to the interior components of system 101 which are discussed below.

It is further contemplated and will be appreciated that the one or more LEDs 113 is exemplary, and it should be understood that other light emitting sources, such as, but not limited to, incandescent, plasma and fiber-optic sources may be utilized. It is likewise contemplated and will be appreciated that the one or more LEDs 113 may emit one or more identical colors, different colors, or a combination thereof. For example, the one or more LEDs may emit a green color to inform the user that the system is ready to take in an item to be shredded. In another example, the one or more LEDs may emit a yellow color to inform the user that the access door is not properly closed.

Figure 2A:
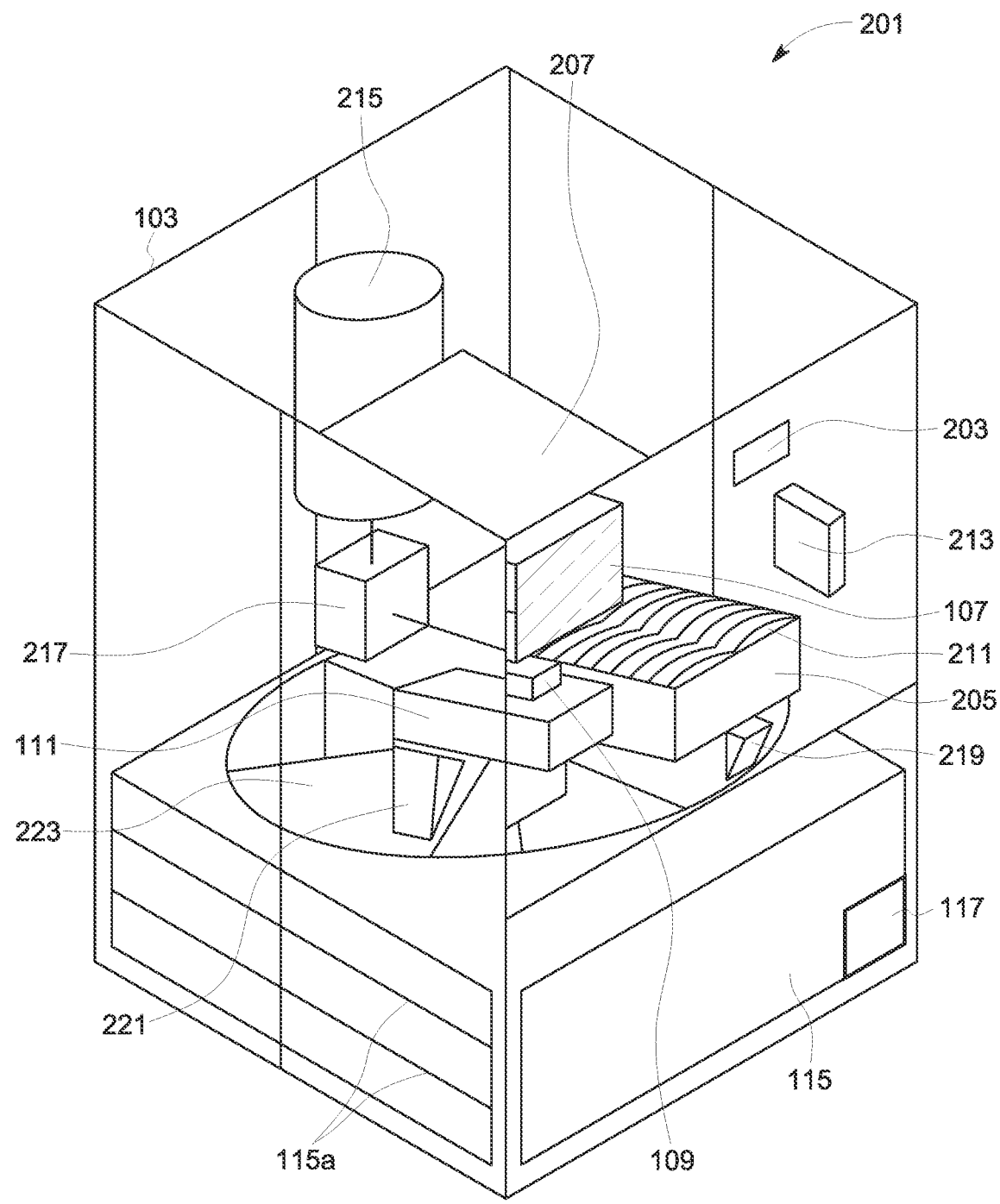
FIG. 2A is a perspective inside view of a size reduction and storage device system in accordance with a preferred embodiment of the present invention.
Figure 2B:
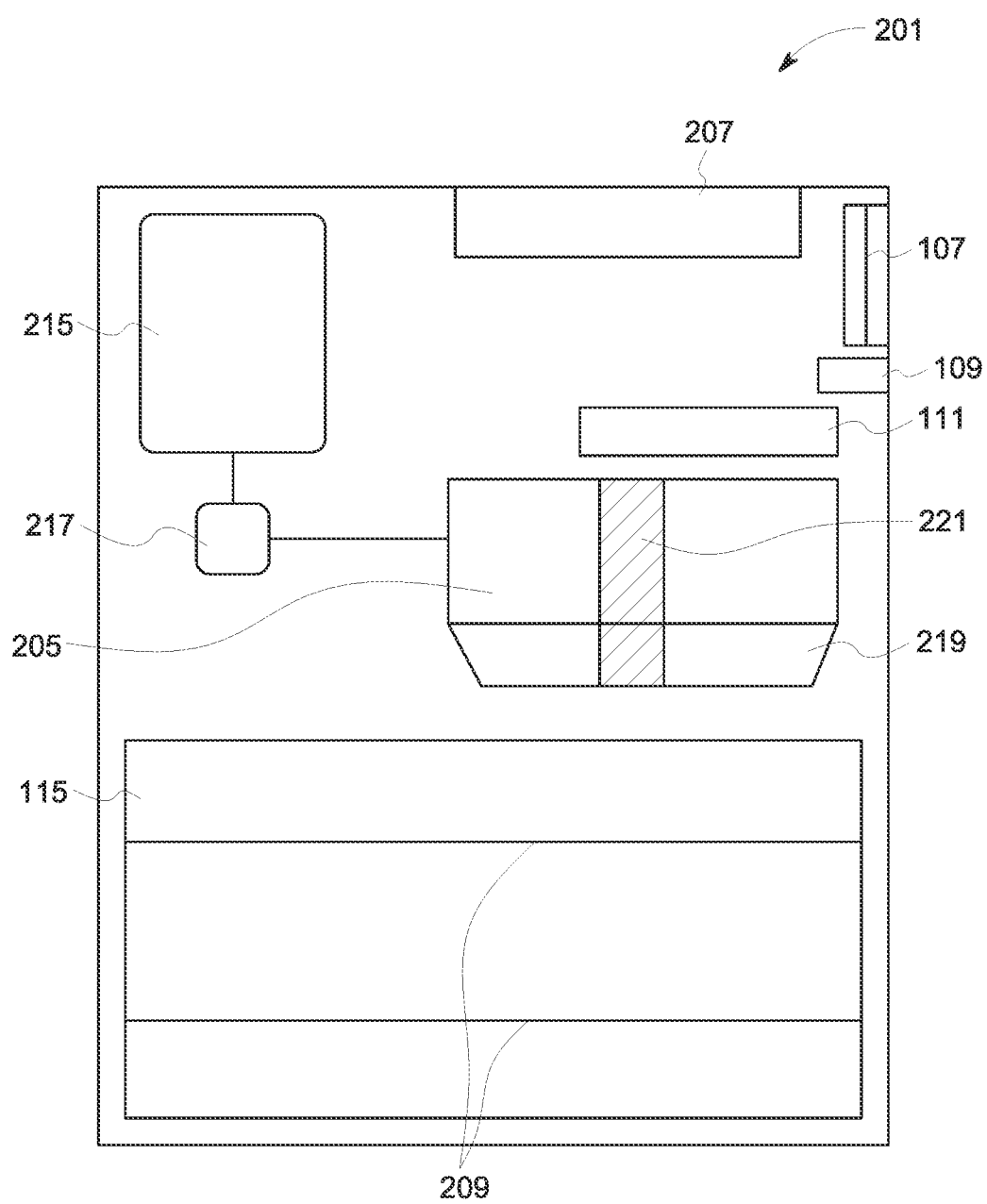
FIG. 2B is a schematic side profile inside view of a size reduction and storage device system in accordance with a preferred embodiment of the present invention.

Referring now to FIGS. 2A and 2B, with reference to FIG. 1, a perspective inside view of a size reduction and storage device system 201 and a schematic side profile inside view of a size reduction and storage device system 201 in accordance with a preferred embodiment of the present invention are shown, respectfully. In the contemplated embodiment, system 201 includes a safety locking mechanism 203 as a means to prevent the access door 105 from opening during use. Additionally, system 201 includes a hinge 211 in communication with the access door 105 and the housing unit 103 to facilitate the opening and closing of the access door 105. System 201 also incorporates one or more drawer glides 209 to facilitate the opening and closing of the storage drawer 115. System 201 also includes a computer system 207 (further discussed below and shown in FIG. 10), a storage unit 223 (further discussed below and shown in FIG. 5), a cleaning system 601 (further discussed below and shown in FIGS. 7A, 7B and 7C), and a heating system 515 (further discussed below and shown in FIGS. 5 and 6).

Moreover, system 201 includes an electric motor 215 in communication with a gear reduction box 217. System 201 incorporates at least one size reduction unit for nonflexible material 205 in communication with the gear reduction box 217. The electric motor 215 powers the gear reduction box 217 to drive the size reduction unit for nonflexible material 205 to shred nonflexible material (not shown) to a predetermined size.

System 201 also includes an apparatus 213 to detect and analyze the type of plastic a nonflexible material (not shown) is. It is contemplated and will be appreciated that the apparatus 213 comprises of suitable material capable of ensuring that the correct identification of each plastic type is assigned to each nonflexible material. For example, when a user places a nonflexible material (e.g., a milk container) inside the access door 105, the apparatus 213 may scan the nonflexible material and categorize the nonflexible material as Plastic #2.

System 201 also incorporates a large chute 219, small chute 221, and a storage unit 223. The large chute 219 is in communication with the size reduction unit for nonflexible material 105 and the storage unit 223. Likewise, the small chute 221 is in communication with size reduction unit for flexible material 111 and the storage unit 223. The storage unit 223 is divided into one or more storage chambers (not shown, see FIG. 5). During use, the large chute 219 transfers shredded nonflexible material (not shown) from the size reduction unit for nonflexible material 205, through the storage unit 223 and into an assigned storage chamber 505 (not shown, see FIG. 5). Likewise, during use, the small chute 221 transfers shredded flexible material (not shown) from the size reduction unit for flexible material 111, through the storage unit 223 and into an assigned storage chamber 505 (not shown, see FIG. 5).

System 201 further includes the printer 119 in communication with the computer system 207. The computer system 207 generates serial lot tracking and other tracking type numbers upon which the printer 119 will print the respected serial lot tracking and other tracking type numbers onto a shipping label. Examples of the printer 119 include, but are not limited to, thermal printers, single-function inkjet printers, multi-function inkjet printers, photo inkjet printers, ink tank printers, monochrome laser printers, color laser printers, LED printers, dot matrix printers, and the like.

Referring now to FIGS. 3A through 3D, various embodiments of the size reduction unit for flexible material are shown. Specifically, FIG. 3A, with references to FIGS. 1, 2A, and 2B, presents a schematic of a size reduction unit for flexible material 301. As shown, a housing unit 303 is in communication with the LED 113a and the entryway of the size reduction unit for flexible material 111. The housing unit 303 encases at least one series of large rollers 305 containing at least one roller axle 319, at least one male cutting roller 307, and at least one female cutting roller 309.

As shown, a texturized belt 315 surrounds one or more individual large rollers, for instance large rollers 305a and 305b, containing one or more belt position rollers 325. Additionally, the series of large rollers 305 are oriented on one or more spindles 311 and are powered by a roller motor 313. During use, the roller motor 313 turns a roller belt 317 which moves flexible material (not shown) (e.g., clear food packaging) on the texturized belt 315 to the male cutting roller 307 and the female cutting roller 309.

Figure 3A:
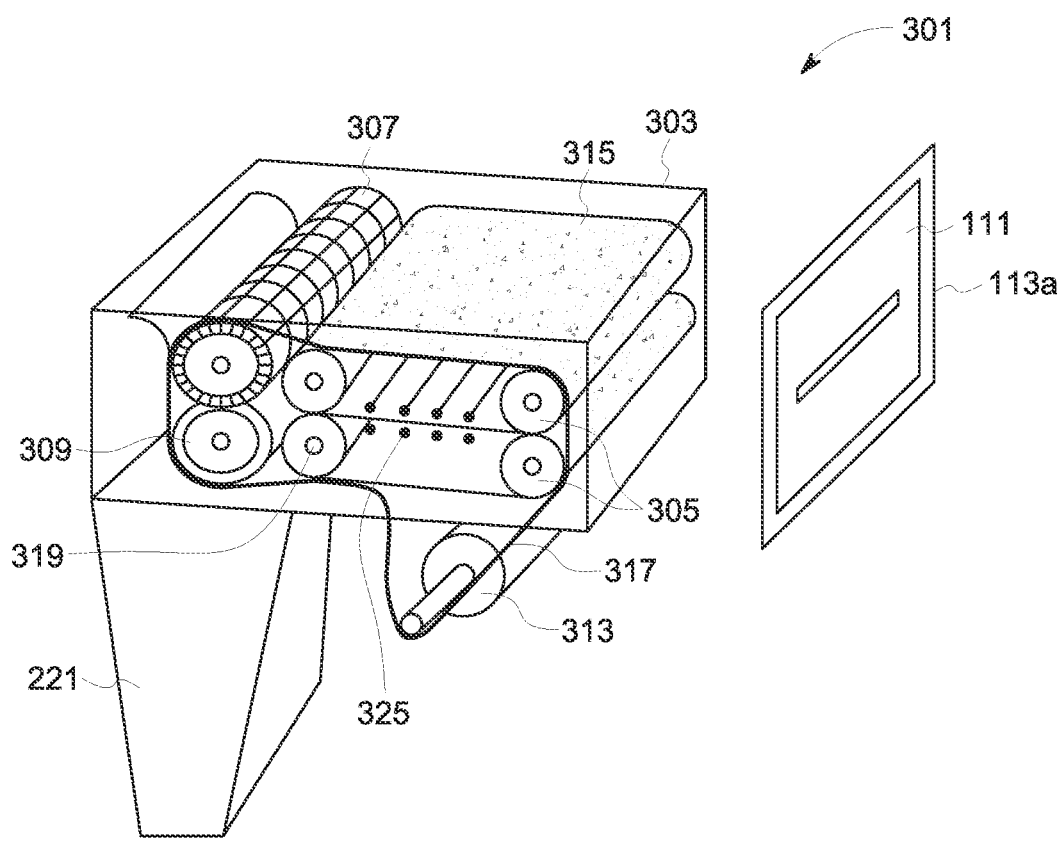
FIG. 3A is a schematic of a size reduction unit for flexible material in accordance with the present application.
Figure 3B:
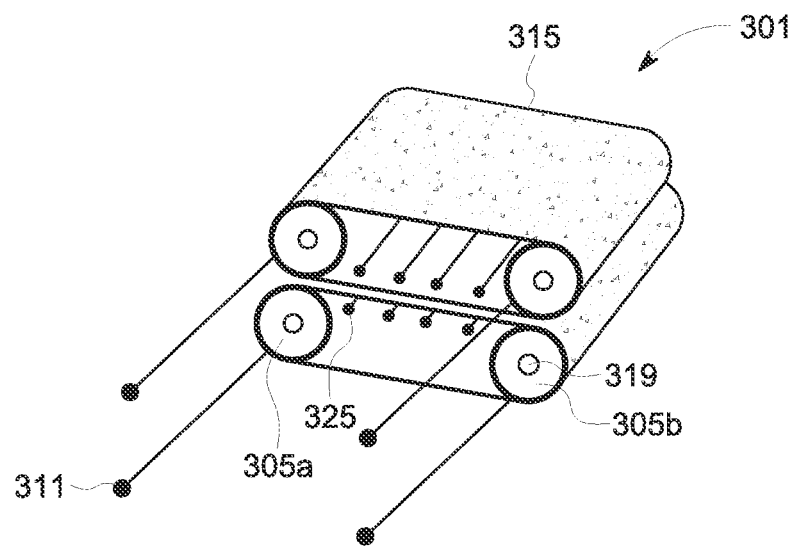
FIG. 3B is a disassembled view of a size reduction unit for flexible material in accordance with the present application, illustrating a set of rollers.
Figure 3C:
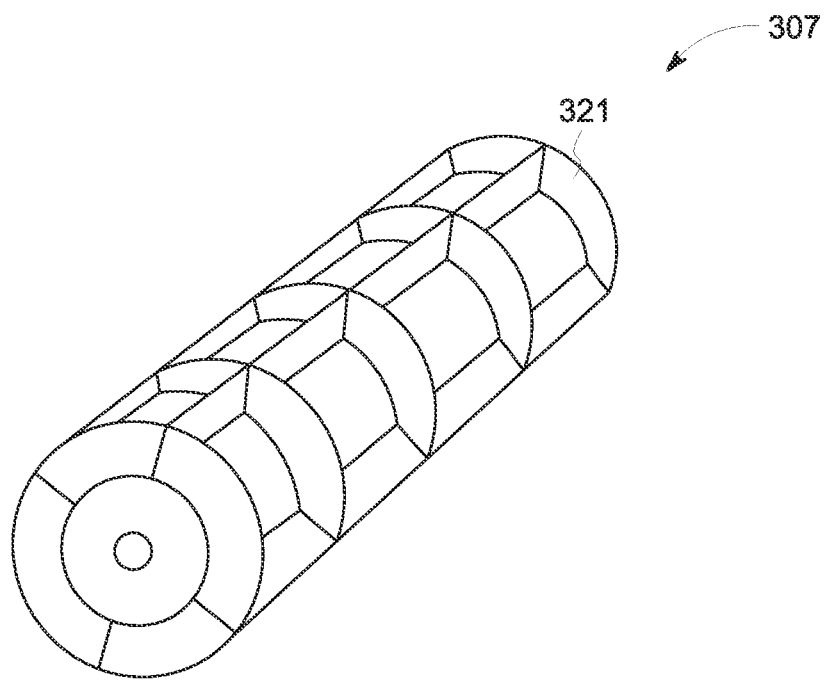
FIG. 3C is a disassembled view of a size reduction unit for flexible material in accordance with the present application, illustrating a male cutting roller.
Figure 3D:
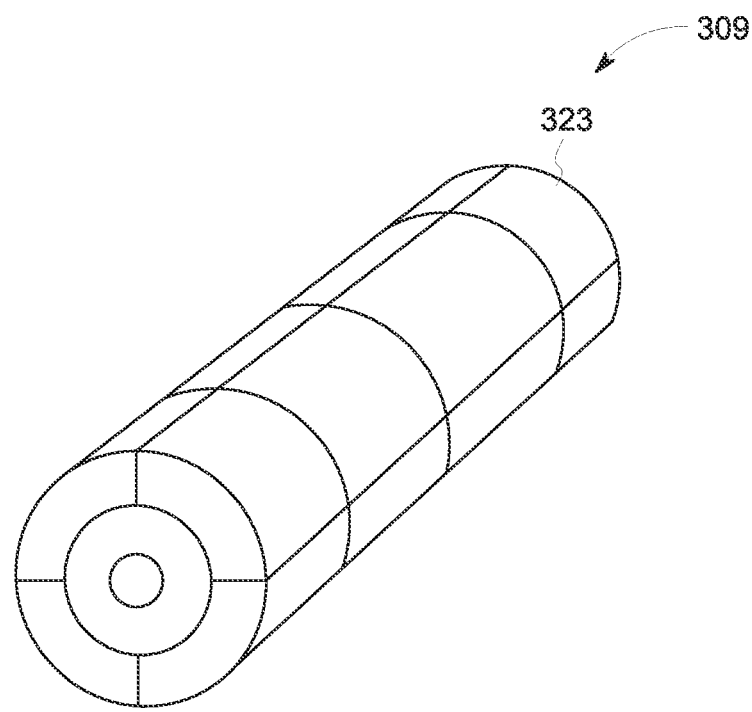
FIG. 3D is a disassembled view of a size reduction unit for flexible material in accordance with the present application, illustrating a female cutting roller.

As shown in FIGS. 3C and 3D, the male cutting roller 307 comprises of one or more cutting blades 321 whereas the female cutting roller 309 comprises of one or more slotted surfaces 323. During use, as the texturized belt 315 transfers flexible material (not shown) to the male cutting roller 307 and the female cutting roller 309, the flexible material is cut to a predetermined size and is dropped into the small chute 221 to be deposited into its assigned storage chamber 505 (not shown, see FIG. 5).

It is contemplated and will be appreciated that the roller axle 319 may be turned by the roller motor 313, the roller belt 317, or any suitable device to achieve the same rotating results.

Figure 4:
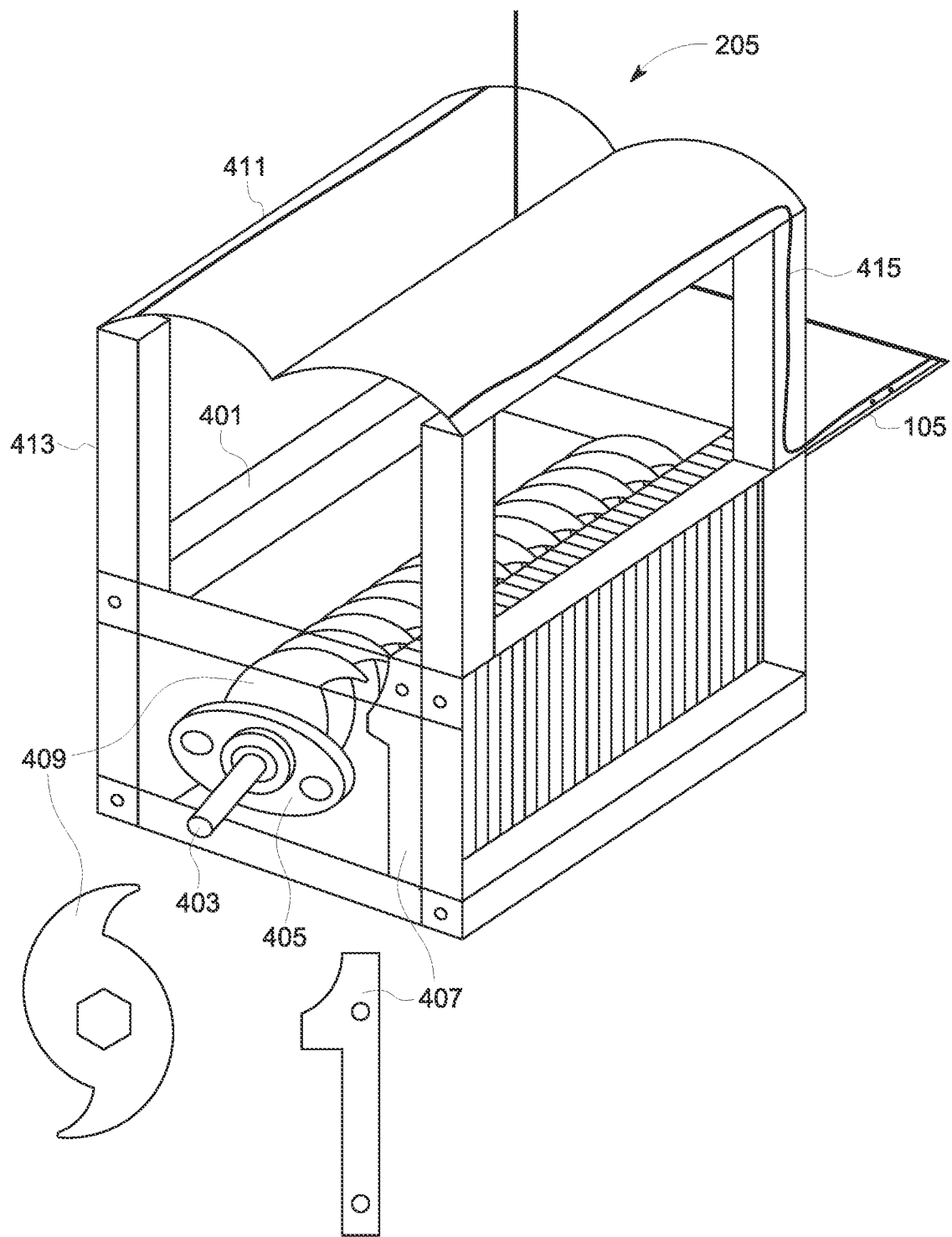
FIG. 4 is a schematic of a size reduction unit for non-flexible material in accordance with a preferred embodiment of the present invention.

Referring now to FIG. 4, a schematic of a size reduction unit for nonflexible material 205 is shown. In one embodiment, the size reduction unit for nonflexible material 205 comprises of a shredding house 401 encasing one or more shredding shafts 403, one or more shredding bearings 405, one or more shredding fixed knives 407, and one or more shredding mobile knives 409. The size reduction unit for nonflexible material 205 also incorporates a plunge 411 which supported by one or more pillars and is oriented above the shredding house 401. A series of one or more cables 415 are in communication with the plunge and the access door 105 to facilitate the raising and lowering of the plunge 411 away and toward the shredding house 401, respectfully.

It is contemplated and will be appreciated that the size reduction unit for nonflexible material 205 may be a shredder, grinder, or other similar device suitable to cut, slice, shred, grate, grind, or a combination thereof nonflexible material into predetermined sizes.

It is also contemplated and will be appreciated that the shredding fixed knives 407 and the shredding mobile knives 409 may include any suitable shape to cut the nonflexible material into predetermined sizes.

It is further contemplated and will be appreciated that the size reduction unit for nonflexible material 205 may include a plunge 411 to facilitate the cutting process of the nonflexible material into predetermined sizes.

Figure 5:
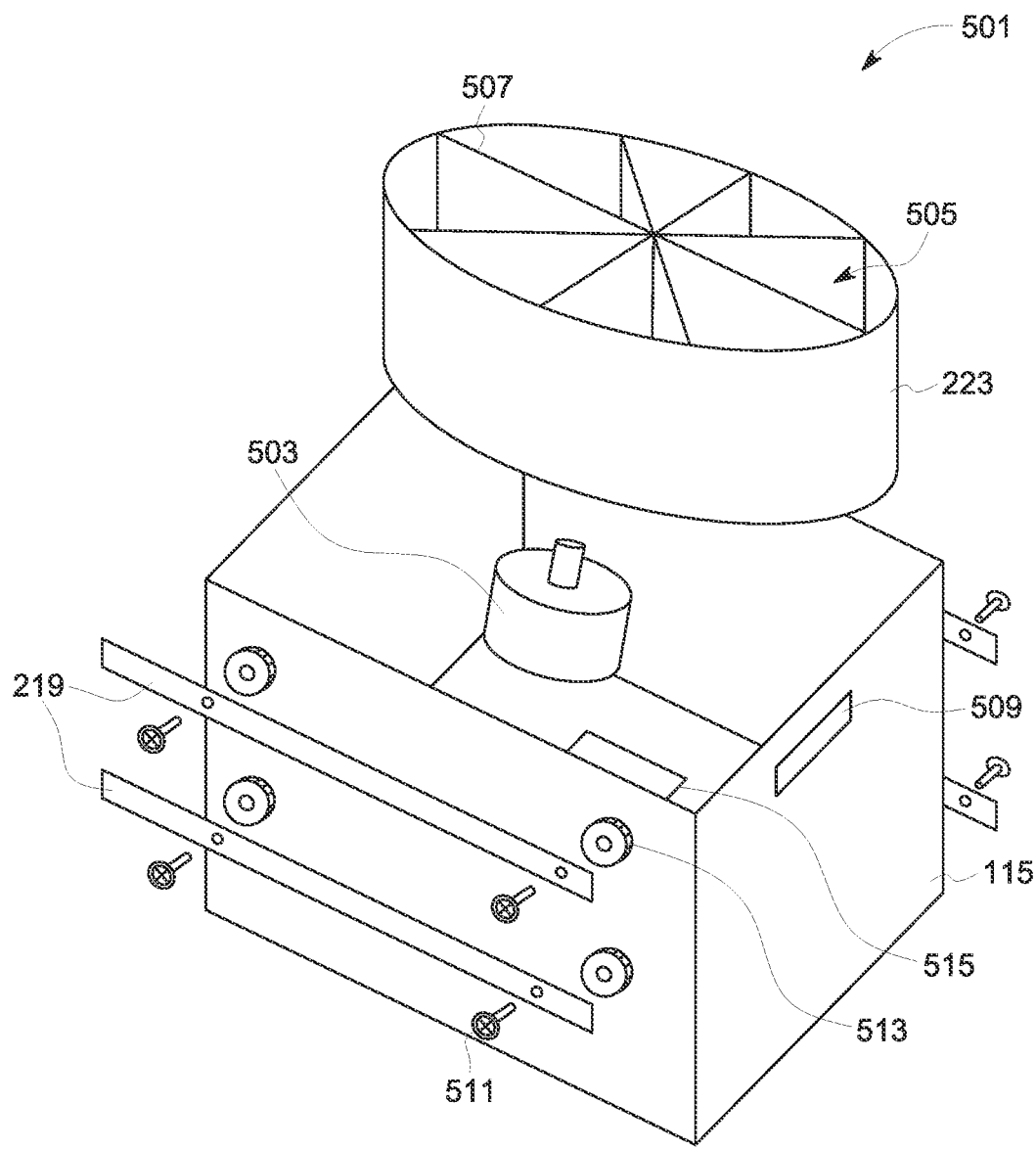
FIG. 5 is a schematic of a storage unit and several components in accordance with a preferred embodiment of the present invention.

FIG. 5, with references to FIGS. 1, 2A and 2B, presents a schematic of a storage unit and several components 501 in accordance with a preferred embodiment of the present invention. As shown, the schematic 501 includes at least one storage unit 223, a storage motor 503, a plurality of storage chambers 505, one or more dividers 507, and a heating system 515. The dividers 507 section the storage unit 223 into the plurality of storage chambers 505. The storage unit 223 and the storage motor 503 are oriented within the storage drawer 115 with a handle 509 to allow a user to open and close the storage drawer 115. The storage drawer 115 also includes a plurality of rollers 513 to facilitate opening and closing. A plurality of hardware 511 secures the drawer glides 209 to the housing unit 103 in which allows the storage drawer 115 to travel on the plurality of rollers 513.

During use, the storage motor 503 rotates the storage unit 223 to allow an assigned storage chamber 505 to receive a specific material (not shown) from the small chute 221 or from the large chute 219 after the material has been reduced in size.

As discussed above, the heating system 515 may utilize heating methods including, but not limited to, fuel-based, electricity-based, gas-based, and steam-based to further reduce the size of material (not shown).

It is contemplated and will be appreciated that the storage motor 503 is in communication with the computer system 207.

Figure 6:
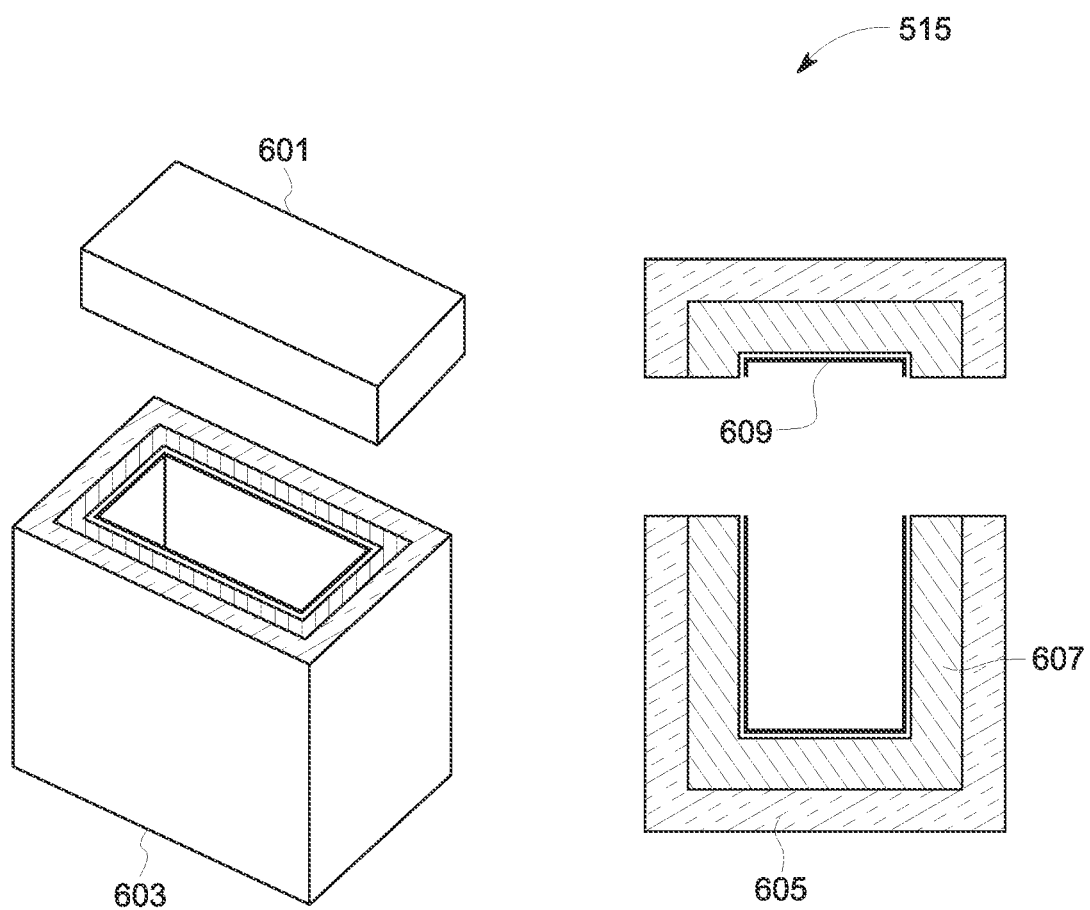
FIG. 6 is a schematic of a heating system in accordance with a preferred embodiment of the present invention.

FIG. 6 presents a schematic of the heating system in accordance with a preferred embodiment of the present invention. The heating system 515 comprises of a container 603 with a lid 601. The container 603 incorporates an insulated layer 605, a heat layer 607, and a removable inner layer 609.

It is contemplated and will be appreciated that the heating system 515 facilitates to further reduce the size of flexible material, nonflexible material, or both by utilizing methods that are, but not limited to, fuel-based, electricity-based, gas-based, and steam-based.

It is also contemplated and will be appreciated that the insulated layer 605 may include material such as rock wool, slag wool cellulose, glass wool, polystyrene, double walled paper, foam insulation, or other suitable material.

It is likewise contemplated and will be appreciated that the heat layer 607 may include material such as metal heating elements, positive temperature coefficient (PCT) heating elements, composite heating elements, and the like.

It is further contemplated and will be appreciated that the inner layer 609 comprises of crucible material suitable to hold shredded material (not shown) and subject said shredded material to high temperatures.

Figure 7A:
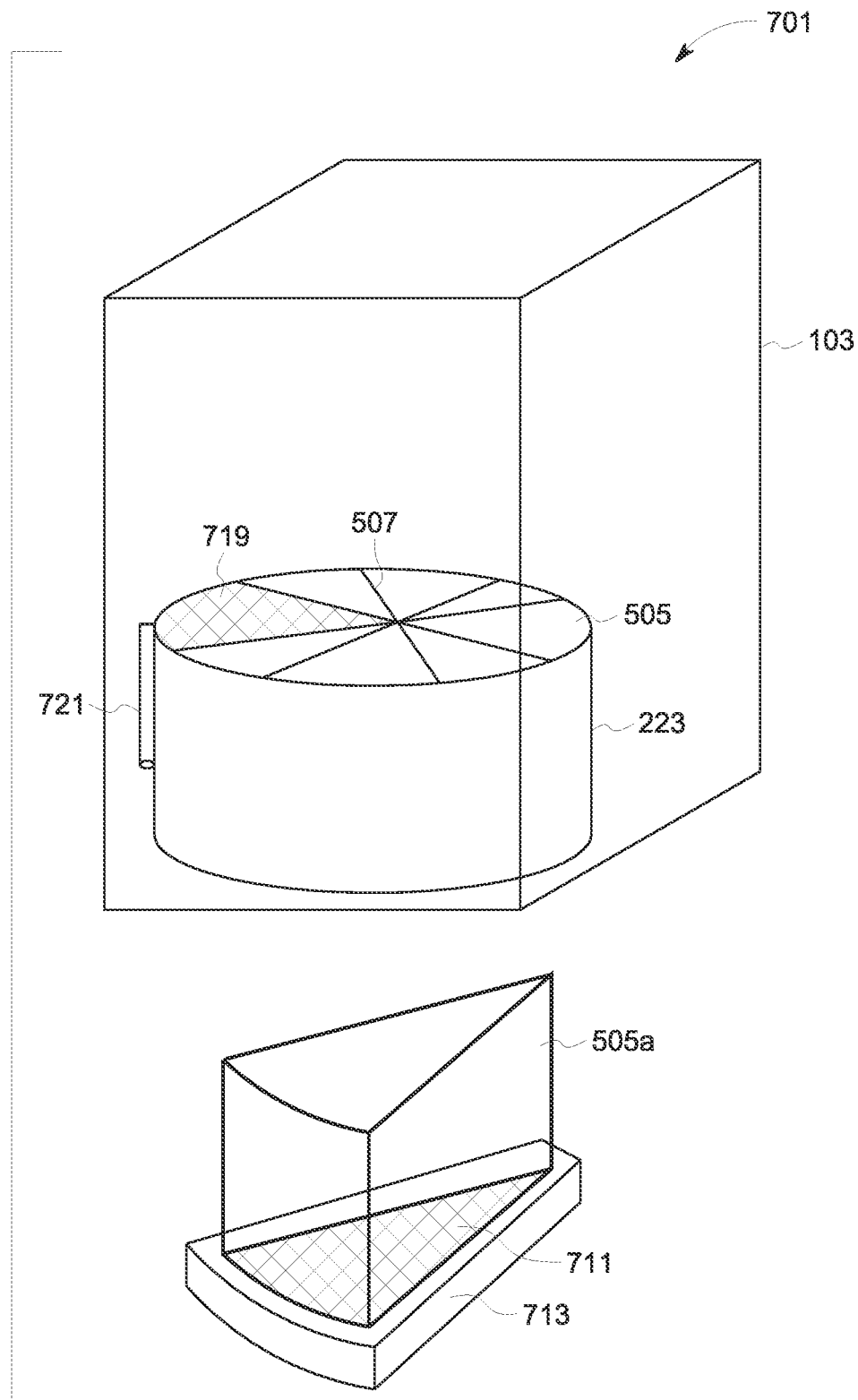
FIG. 7A is a schematic of a cleaning system in accordance with a preferred embodiment of the present invention.
Figure 7B:
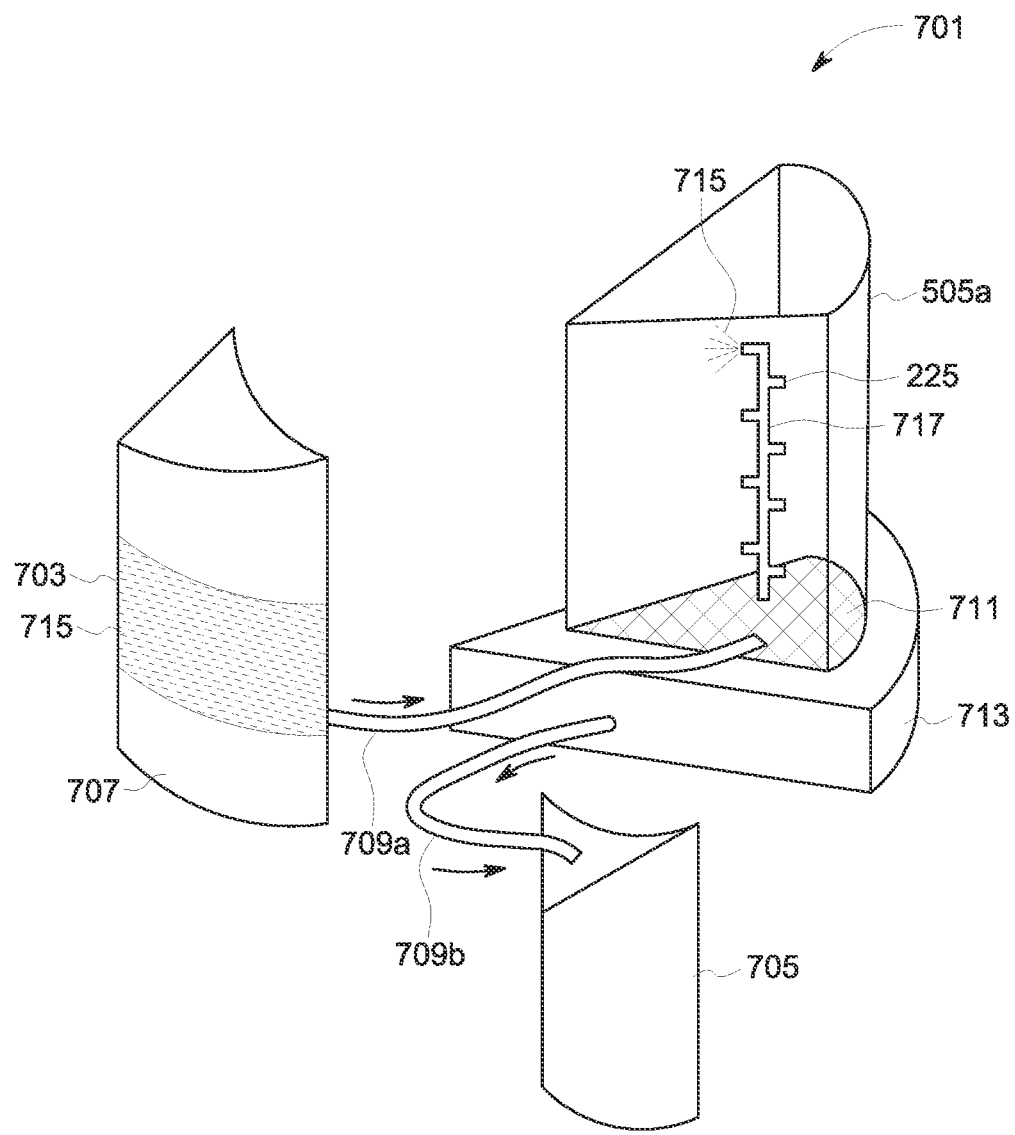
FIG. 7B is a disassembled cross-sectional view of the cleaning system of FIG. 7A in accordance with the present application.
Figure 7C:
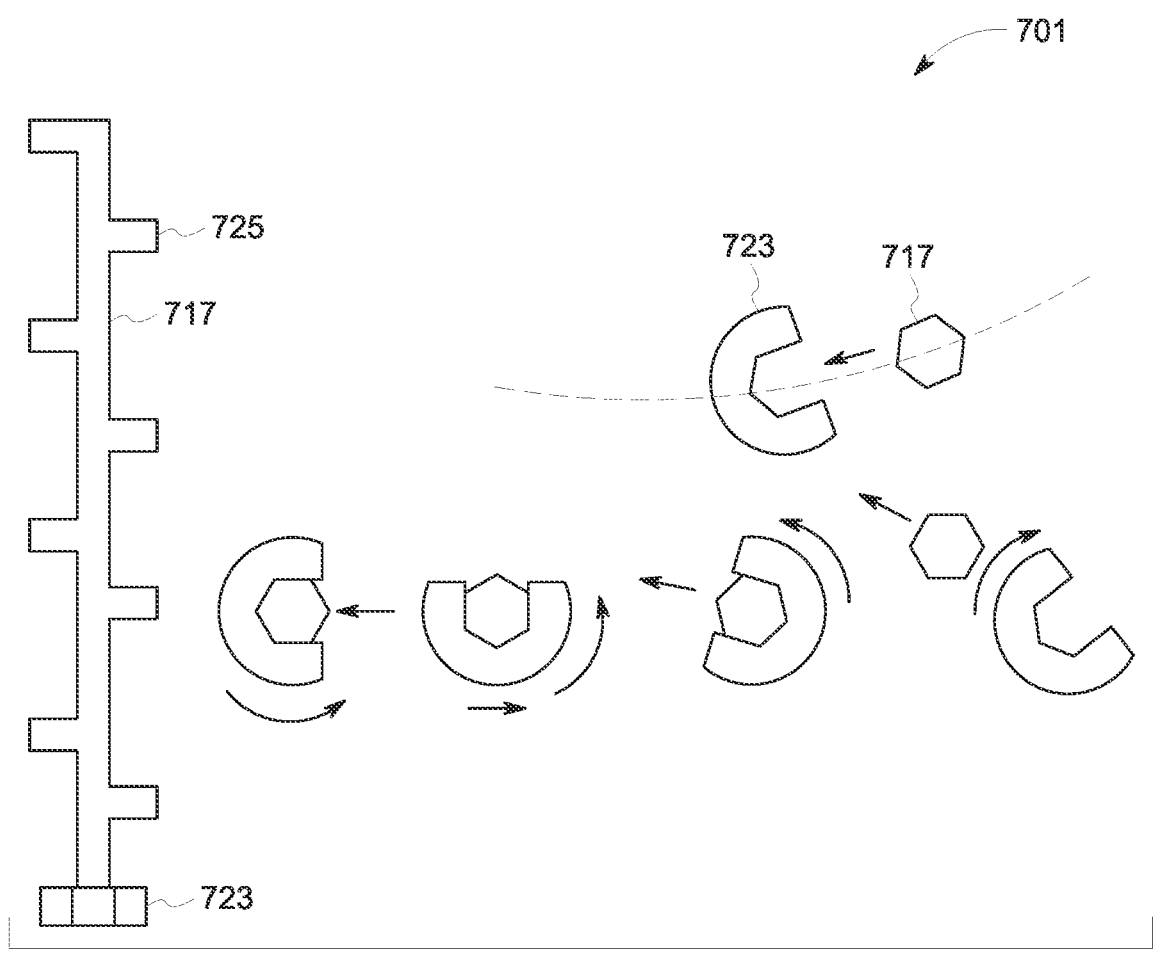
FIG. 7C is a schematic of a spray wand of the cleaning system in FIG. 7A in accordance with the present application.

FIGS. 7A, 7B, and 7C, with reference to FIGS. 1 through 5, depict various embodiments of a cleaning system 701 in accordance with the present application. The cleaning system 701 includes a reservoir 703, a heating element 707, one or more hoses 709, one or more direction control valves 723, a drip pan 713, and a waste reservoir 705.

The reservoir 703 houses a cleaning agent 715 which is used to remove contaminants (not shown) from shredded material (not shown). The hose, for instance hose 709a, bridges the reservoir 703 and an assigned storage chamber, for instance storage chamber 505a. Each assigned storage chamber 505 includes a screen 711 and a spray wand 717 comprising of a plurality of spray heads 725. A direction control valve 723 bridges the hose 709 and the spray wand 717. The screen 711 holds shredded material while allowing the cleaning agent 715 and contaminates to drip onto the drip pan 711. The plurality of spray heads 725 release the cleaning agent 715 into the storage chamber 505 as the spray wand 717 rotates.

During use, the heating element 707 heats up the cleaning agent 715 inside the reservoir 703 before the cleaning agent 715 is released from the reservoir 703 and into the hose 709. The hose, for instance 709a, transfers the cleaning agent 715 from the reservoir 703 and into the spray wand 717 of an assigned storage chamber, for instance storage chamber 505a, as depicted by directional arrows. As the spray wand 717 rotates within the storage chamber 505a, the direction control valve 723 becomes exposed, allowing the cleaning agent to flow through the spray wand 717 and out through the plurality of spray heads 725. A hose, for instance 709b, transfers mixture of cleaning agent 715 and contaminants from the drip pan 713 and into the waste reservoir 705.

It is contemplated and will be appreciated that the cleaning system 701 may include a lid 719 on each storage chamber 505. It is also contemplated and will be appreciated that the cleaning system 701 may incorporate a condensation tube 721 to transfer condensation into the drip pan 713.

It is further contemplated and will be appreciated that the cleaning system 701 is in communication with the computer system 207.

It is also contemplated and will be appreciated that the cleaning agent 715 may be water, surfactants (e.g., detergent), or any other substance or a combination of substances suitable to achieve cleaning results.

It is likewise contemplated and will be appreciated that the heating element 707 may be any device suitable to convert electrical energy into heat to achieve heating effects of the cleaning agent 715.

It is further contemplated and will be appreciated that the spray head 725 may release the cleaning agent 715 in a pulse-like manner, as vapor, or any suitable fashion to allow adequate removal of contamination from the shredded material.

Figure 8:
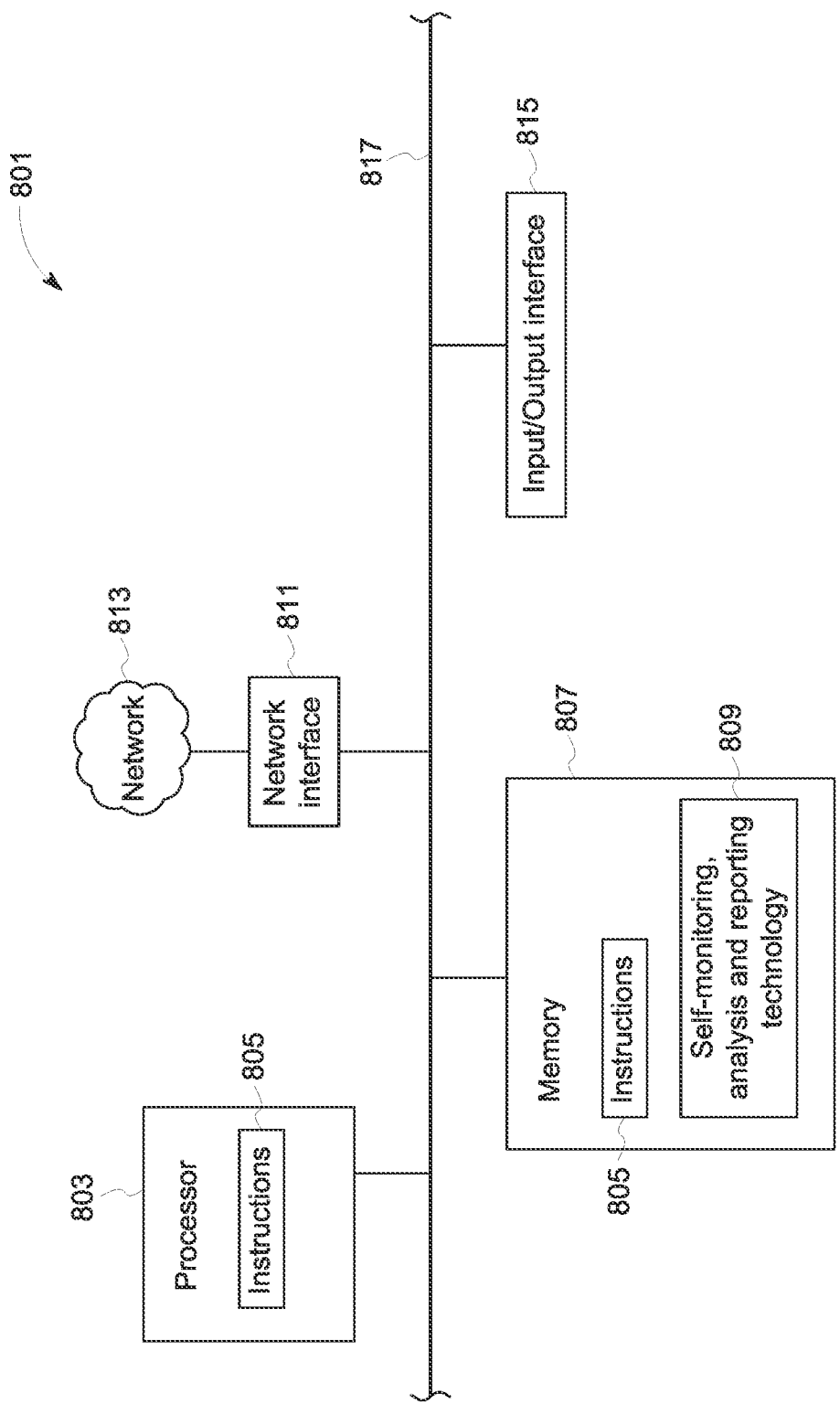
FIG. 8 is a block diagram of a size reduction and storage device system in accordance with an embodiment, illustrating an example of a computer system within which instructions for causing a machine to perform any one or more of the methodologies discussed herein may be executed.

FIG. 8 presents a block diagram of an embodiment of the size reduction and storage device system, illustrating a non-limiting example of a computer system 801 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may also be a personal computer (PC), a portable computer, a desktop computer, a tablet (PC), a set-top box (STB), system-on-a-chip (SoC), a personal digital assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

In the contemplated embodiment, system 801 includes at least one processor 803 (e.g., central processing unit (CPU), system-on-a-chip (SoC), etc.) with or without instructions 805, a memory 807 with or without instructions 805 and with a self-monitoring analysis and reporting technology (SMART) system 809, an input/output (I/O) interface 811, and a network interface device 713, which communicate with each other via a bus 817 (e.g., extended industry standard architecture (EISA), conventional peripheral component interconnect (PCI), universal serial bus (USB), processor FireWire, NuBus, etc.). Instructions 805 may reside, completely or at least partially, within the hardware processor 803 and/or memory 807 during execution thereof by system 801. Instructions 805 may include directions for storing instructions, performing one or more functions, and the like.

System 801 also includes a network interface device 813 which facilitates communication with between the computer system 801 and other computing systems (not shown in FIG. 8) via one or more networks 815. Other computing systems, for example, may include conventional computing devices as described above, internet connected devices/systems, or an external storage such as a server, or a cloud computing system.

It is contemplated and will be appreciated that system 801 may include one or more processors, one or more memory units, and one or more I/O interfaces.

It is also contemplated and will be appreciated that memory 807 may include any computer-readable medium or computer program product known in the art including, for example, volatile memory, such as static random access memory (SRAM) and dynamic random access memory (DRAM), and/or non-volatile memory, such as read-only memory (ROM), erasable programmable ROM, flash memories, hard disk drives (HDDS), solid-state drives (SSDs), embedded MultiMediaCards (eMMC), optical disks, compact disks (CDs), digital versatile disc or digital video disc (DVDs) and magnetic tapes. The memory 807 may further include one or more module (not shown in FIG. 8) to perform the methodologies described herein.

It is further contemplated and will be appreciated that the SMART system 809 may detect and report one or more indicators of system 801 reliability. For example, the SMART system 809 may detect that the storage unit 223 is reaching maximum capacity and alters the user so that he or she may take appropriate action.

It is also contemplated and will be appreciated that network 813 may be a wireless network, a wired network, or a combination thereof. Network 813 may also be an individual network or a collection of many such individual networks, interconnected with each other and functioning as a single large network, e.g., the Internet or an intranet. Network 813 may be implemented as one of the different types of networks, such as intranet, local area network (LAN), wide area network (WAN), the internet, near field communication (NFC), and such. Network 813 may either be a dedicated network or a shared network, which represents an association of the different types of networks that use a variety of protocols. Further, network 813 may include network devices, such as network switches, hubs, routers, host bus adapters (HBAs), for providing a communication link between system 101 and other connected devices and/or systems.

It is also contemplated and will be appreciated that the I/O interface 815 may include a variety of software and hardware interfaces (e.g., a web interface, a graphical user interface, and the like). The I/O interface 815 may allow system 801 to interact with a user directly or through the user devices. Further, the I/O interface 815 may enable system 801 to communicate with other computing devices, such as web servers and external data servers (not shown in FIG. 8), or cloud computing systems.

It is likewise contemplated and will be appreciated that the I/O interface 815 can facilitate multiple communications within a wide variety of networks and protocol types, including wired networks, for example, LAN, cable, etc., and wireless networks, such as WLAN, cellular, or satellite. The I/O interface 815 may also include one or more ports for connecting a number of devices to one another or to another server.

Figure 9:
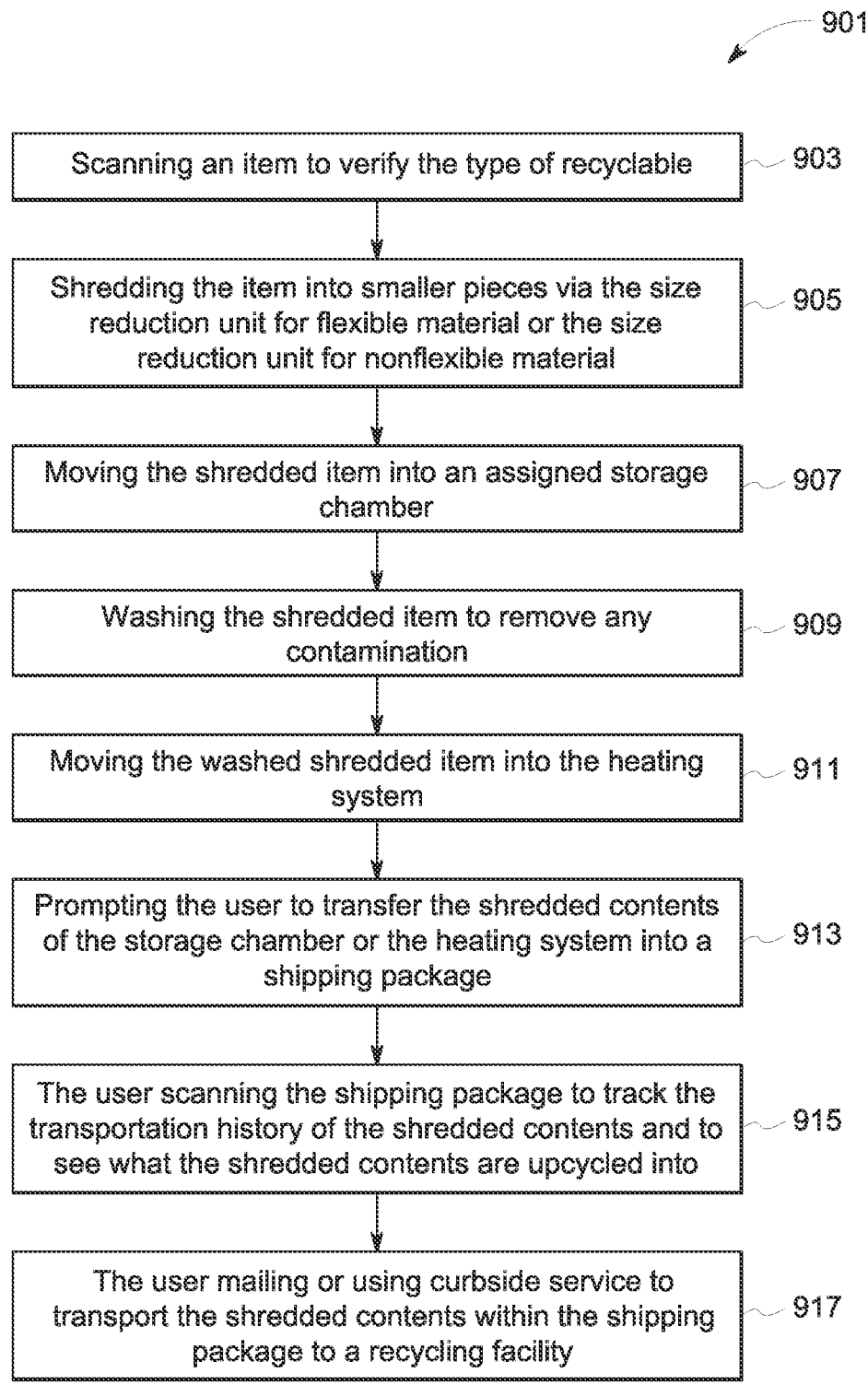
FIG. 9 is a flowchart of the method of use of the systems of the present application.

Referring now to FIG. 9, a flowchart of the method of use 901 of the systems of the present application is shown. The method 901 initiates with step 903 of scanning an item to verify the type of recyclable. The method 901 also includes step 905 of shredding the item into smaller pieces via the size reduction unit for flexible material or the size reduction unit for nonflexible material. The method 901 then includes step 907 of moving the shredded item into an assigned storage chamber. The method 901 also includes step 909 of washing the shredded item to remove any contamination. The method 901 further includes step 911 of moving the washed shredded item into the heating system. The method 901 then includes a step 913 of prompting the user to transfer the shredded contents of the storage chamber into a shipping package. The method 901 then includes step 915 of the user scanning the shipping package to track the transportation history of the shredded contents and to see what the shredded contents are upcycled into. Furthermore, the method 901 includes step 917 of the user mailing or using curbside service to transport the shredded contents within the shipping package to a recycling facility.

It is contemplated and will be appreciated that method 901 may utilize the computer system 207 to accomplish any of the methodologies described herein.

It is also contemplated and will be appreciated that step 903 may take place using scanner 109, apparatus 213 or both.

It is likewise contemplated and will be appreciated that step 913 may include the printer 119 printing out shipping labels for the user to utilize in steps 915 and 917.

Figure 10:
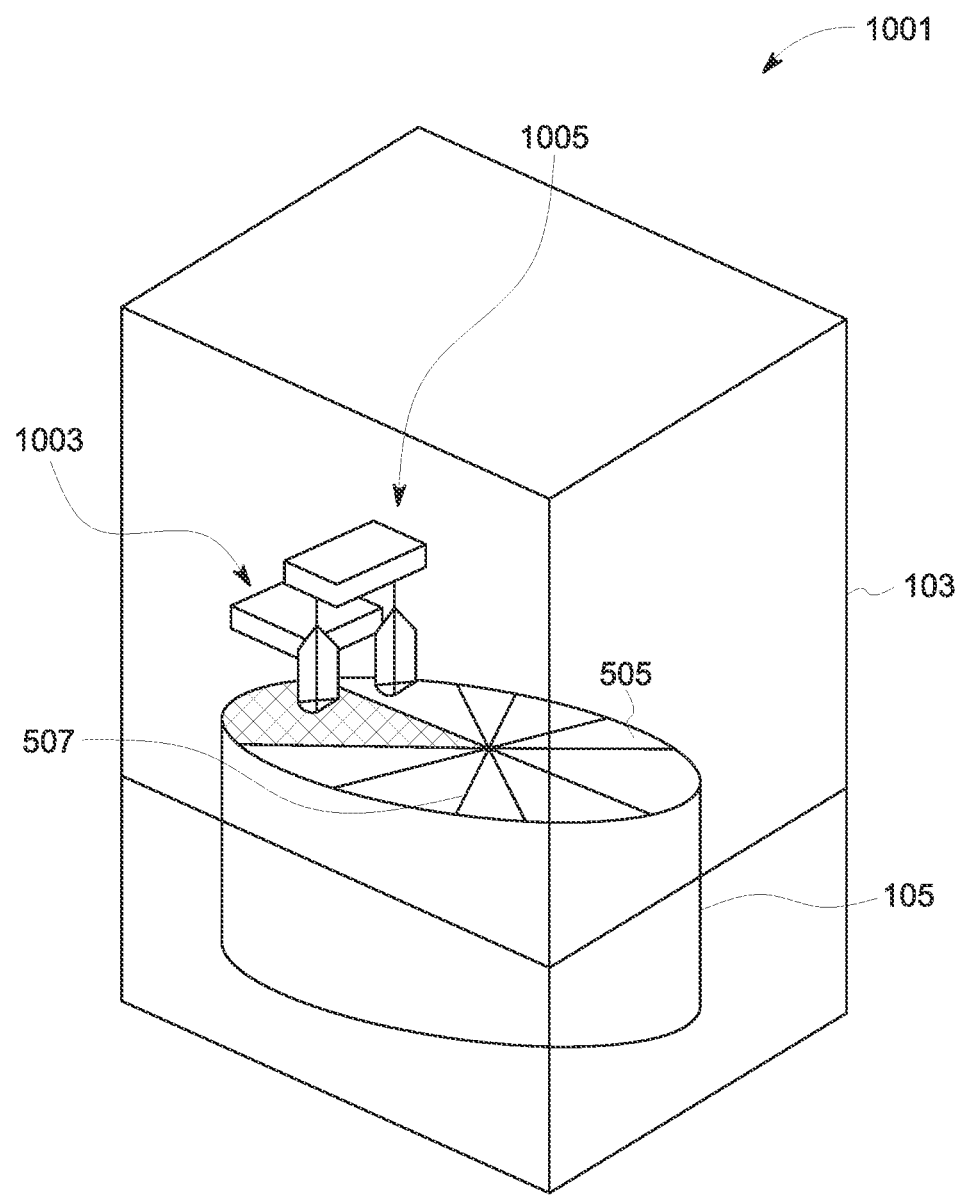
FIG. 10 is a perspective inside view of an alternative size reduction and storage device system in accordance with a preferred embodiment of the present invention.
Figure 11:
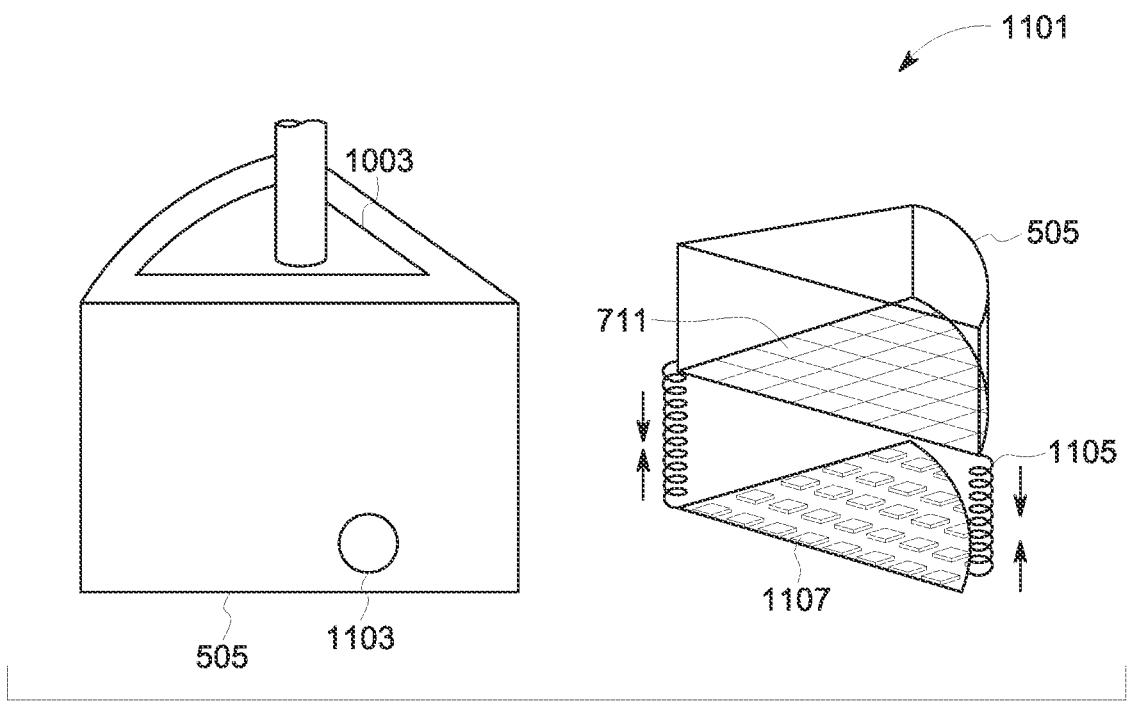
FIG. 11 is a schematic view of the system in FIG. 10 in accordance with a preferred embodiment of the present application.
Figure 12:
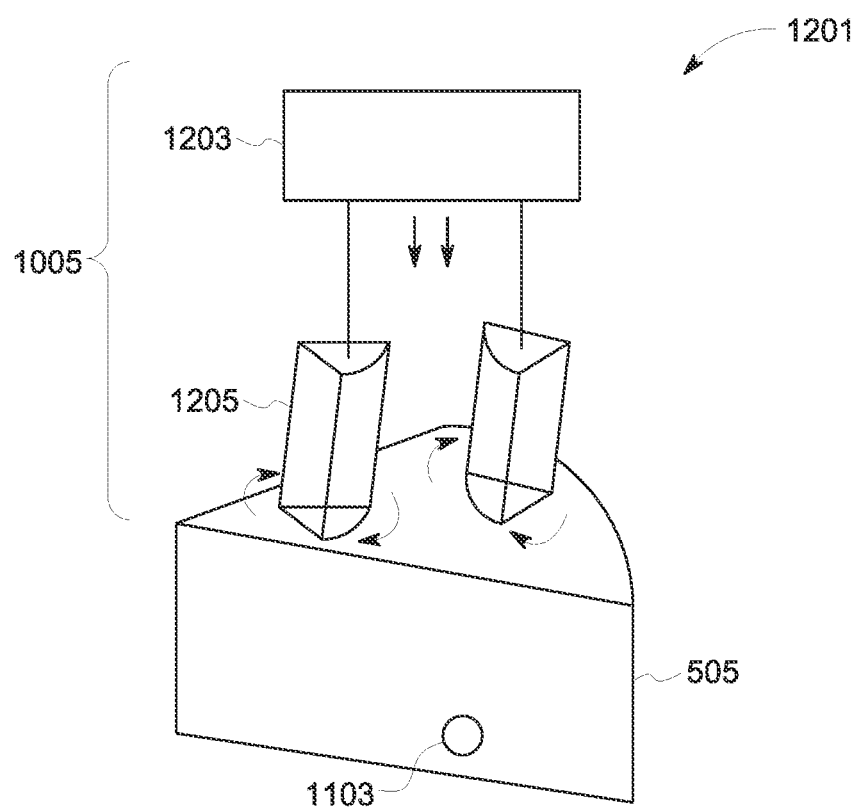
FIG. 12 is a schematic view of the size reduction blades of the system in FIG. 10 in accordance with a preferred embodiment of the present application.

FIGS. 10, 11, and 12 depict various embodiments of an alternative size reduction and storage system 1001 in accordance with the present application. System 1001 includes a plunge 1003 and a reduction blade unit 1005. The plunge 1003 rests on top of the storage chamber 505 and a plurality of springs 1105 hold the storage chamber 505 against a grid 1107 creating a watertight seal. The reduction blade unit 1005 includes a base 1203 which holds one or more blades 1205.

The reduction blade unit 1005 descends into the storage chamber 505 and the one or more blades 1205 rotate within the storage chamber 505 to further reduce the size of material (not shown) as indicated by directional arrows. As the plunge 1003 pushes down into the storage chamber 505, the plurality of springs 1105 expand breaking the watertight seal as indicated by directional arrows. When the plunge 1003 presses into the storage chamber 505, the fluid (not shown) is released out through the drain opening 1103.

Figure 13:
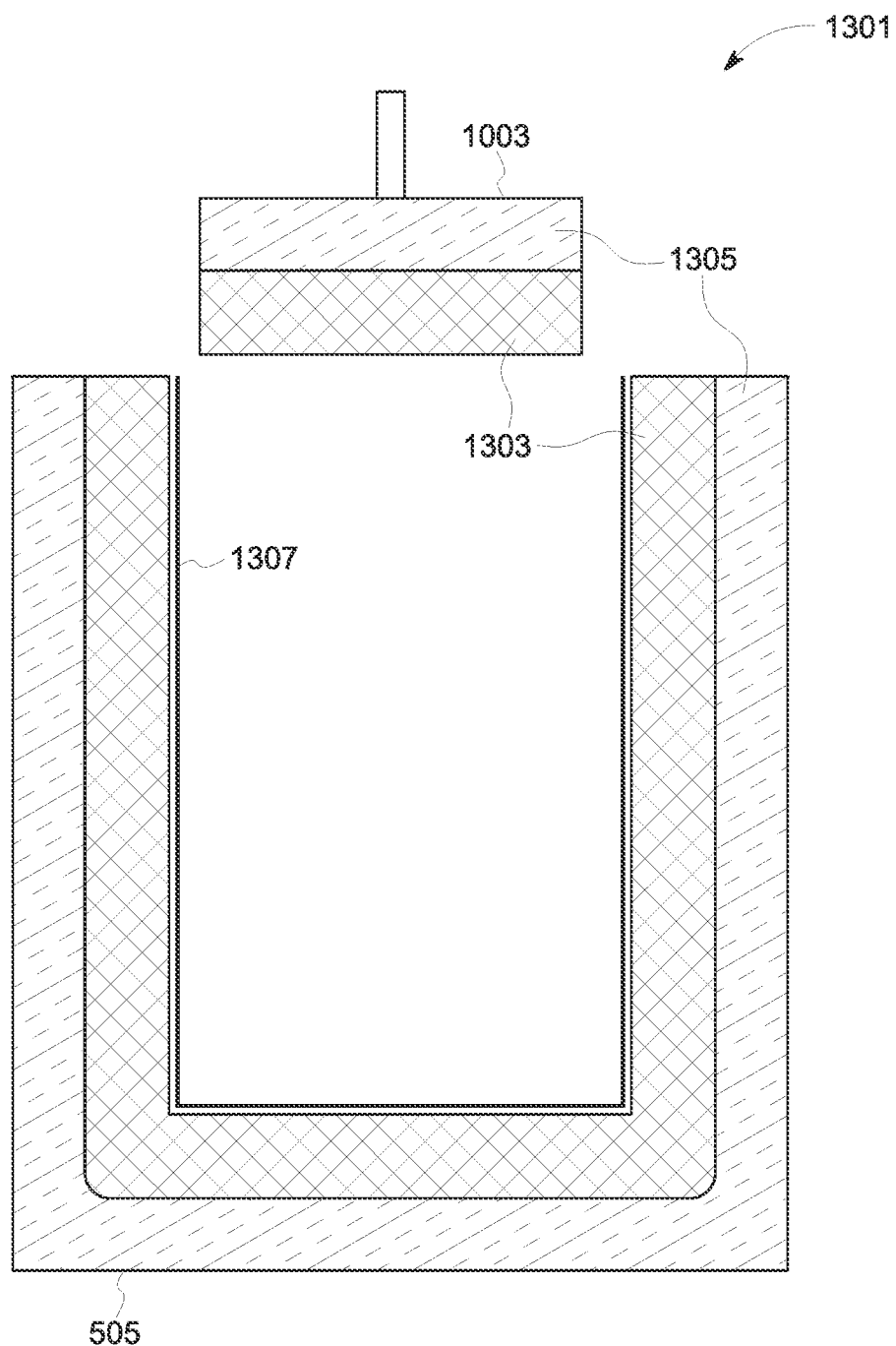
FIG. 13 is a schematic of an alternative heating system in accordance with an embodiment of the present invention.

Referring now to FIG. 13, a schematic of an alternative heating system 1301 is shown. The alternative heating system 1301 comprises of a heat layer 1303 and an insulated layer 1305 which reside within the structure of the plunge 1003 and the storage chamber 505. The alternative heating system 1301 also includes a removable liner 1307 which rests within the cavity of the storage chamber 505. The removable liner 1407 allows for easy cleaning. It should be appreciated that system 1301 allows for further reduction of the size of material such as paper and plastic.

Figure 14:
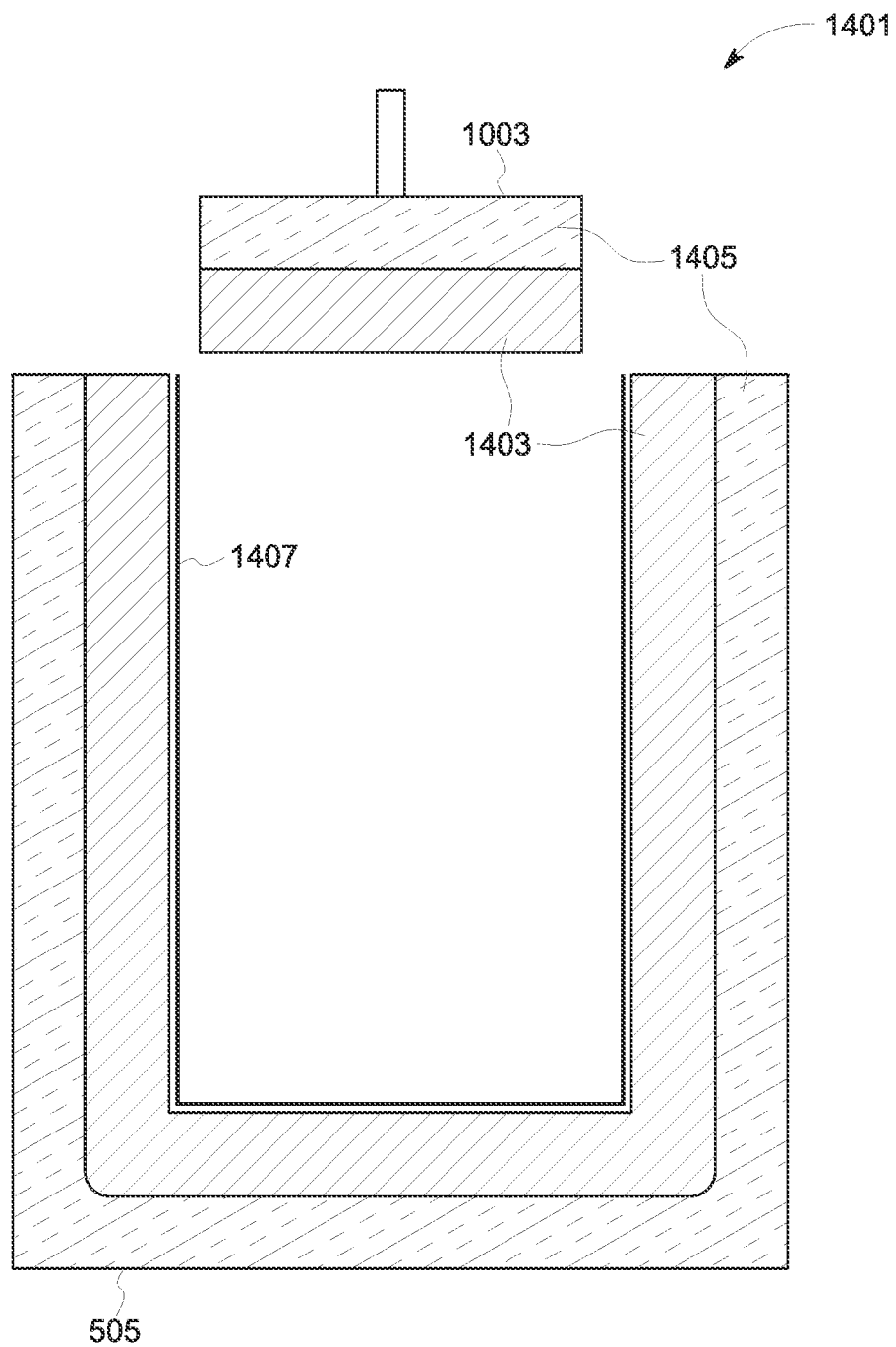
FIG. 14 is a schematic of a cooling system in accordance with a preferred embodiment of the present invention.

Referring now to FIG. 14, a schematic of a cooling system 1401 is shown. The cooling system comprises of a cooling layer 1403 and an insulated layer 1405 which reside within the structure of the plunge 1003 and the storage chamber 505. The cooling system 1401 also includes a removable liner 1307 which rests within the cavity of the storage chamber 505. The removable liner 1407 allows for easy cleaning. It should be appreciated that system 1401 allows for further reduction of the size of material such as food scraps and compost.

Figure 15:
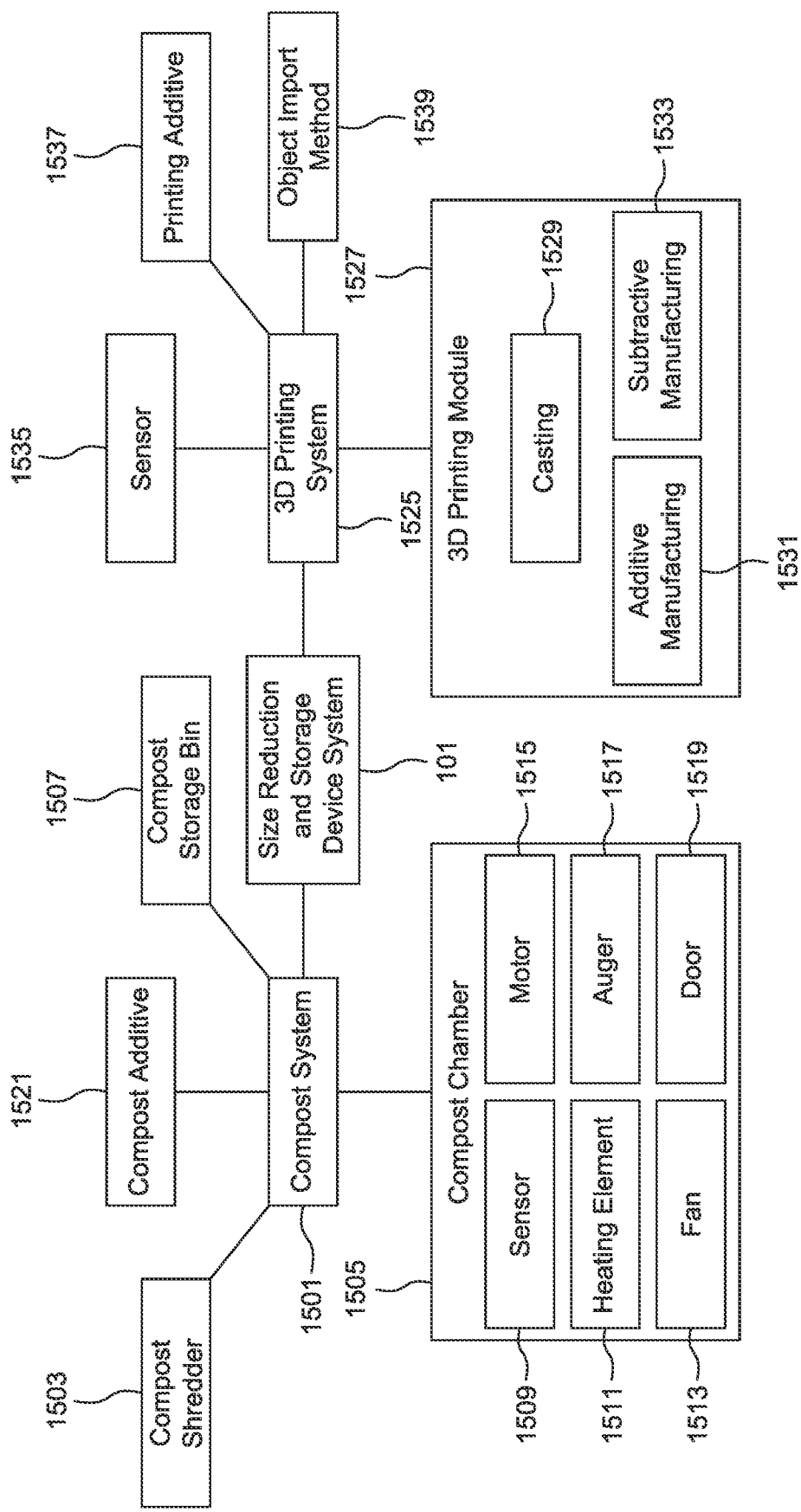
FIG. 15 is a schematic of features associated with the size reduction and storage device system of FIG. 1 in accordance with one or more embodiments of the present invention.

In FIG. 15, a schematic of features associated with the size reduction and storage device system 101. System 101 includes a compost system 1501 for facilitating material size reduction of compostable material such as kitchen waste. The compost system 1501 comprises of a compost shredder 1503, a compost chamber 1505, and a compost storage bin 1507. The compost shredder 1503 is configured to grind compostable material and deposit the grounded compostable material into the compost chamber 1505.

The compost chamber 1505 is configured to facilitate composting of the compostable material. The compost chamber 1505 includes one or more sensors 1509, one or more heating elements 1511, one or more fans 1513, one or more motors 1515, one or more augers 1517, and one or more doors 1519.

The one or more sensors 1509 are configured to temperature and moisture levels of the compostable material.

The one or more heating elements 1511 are configured to facilitate further size reduction of compostable material by utilizing methods that are, but not limited to, fuel-based, electricity-based, gas-based, and steam-based.

The one or more fans 1513 are configured to facilitate air intake and air outflow for aeration and for capturing odor.

The one or more motors 1515 are configured to drive the one or more augers 1517.

The one or more augers 1517 are configured to facilitate oxygenation and de-clumping of the compostable material.

The one or more doors 1519 are configured to control airflow within the compost chamber 1505 and are configured to release compost into the compost storage bin 1507.

During use, the user may add compostable material into the compost shredder 1503 along with compost additives 1523. The compost additives 1523 are configured to accelerate composting process and time. In the preferred embodiment, the compost additives 1523 include a blend of microbes and coco coir. In addition, during use the self-monitoring analysis and reporting technology (SMART) system 809 receives feedback from the one or more sensors 1509 and controls operations of the compost chamber 1505. For example, the SMART system 809 can determine the rotation time and duration of the one or more augers 1517, engagement of the one or more fans 1513 to maintain oxygen, moisture and temperature levels as well as deodorizing gases emitted from the composting process.

System 101 also includes a three-dimensional (3D) printing system 1525 for facilitating 3D printing of one or more objects from material that have been reduced to a predetermined size. It should be understood that the reduced material is reduced via the size reduction unit for flexible material 301, the size reduction unit for nonflexible material 205, or both.

The 3D printing system 1525 includes a 3D printing module 1527 configured to facilitate casting 1529, additive manufacturing 1531, subtractive manufacturing 1533, or a combination thereof to 3D print the one or more objects. The 3D printing system 1525 also includes one or more sensors 1535 configured to ensure that the correct material is used in 3D printing of the one or more objects.

It should be appreciated that during use, the user may add printing additives 1537 to the 3D printing system 1525 to facilitate 3D printing of the one or more objects. Examples of printing additives 1537 may include, without limitation, elastomers, monomers, polymers, fibers, graphene, or other materials required to achieve the desired object. In addition, during use, the user may import one or more desired objects to be 3D printed via one or more object import methods 1539. Examples of object import methods 1539 include, without limitation, WiFi, Bluetooth, LAN, USB, or the like. Further, during use, a shipping label may be generated so that the user may ship the one or more 3D printed objects to a desired location.

Figure 16:
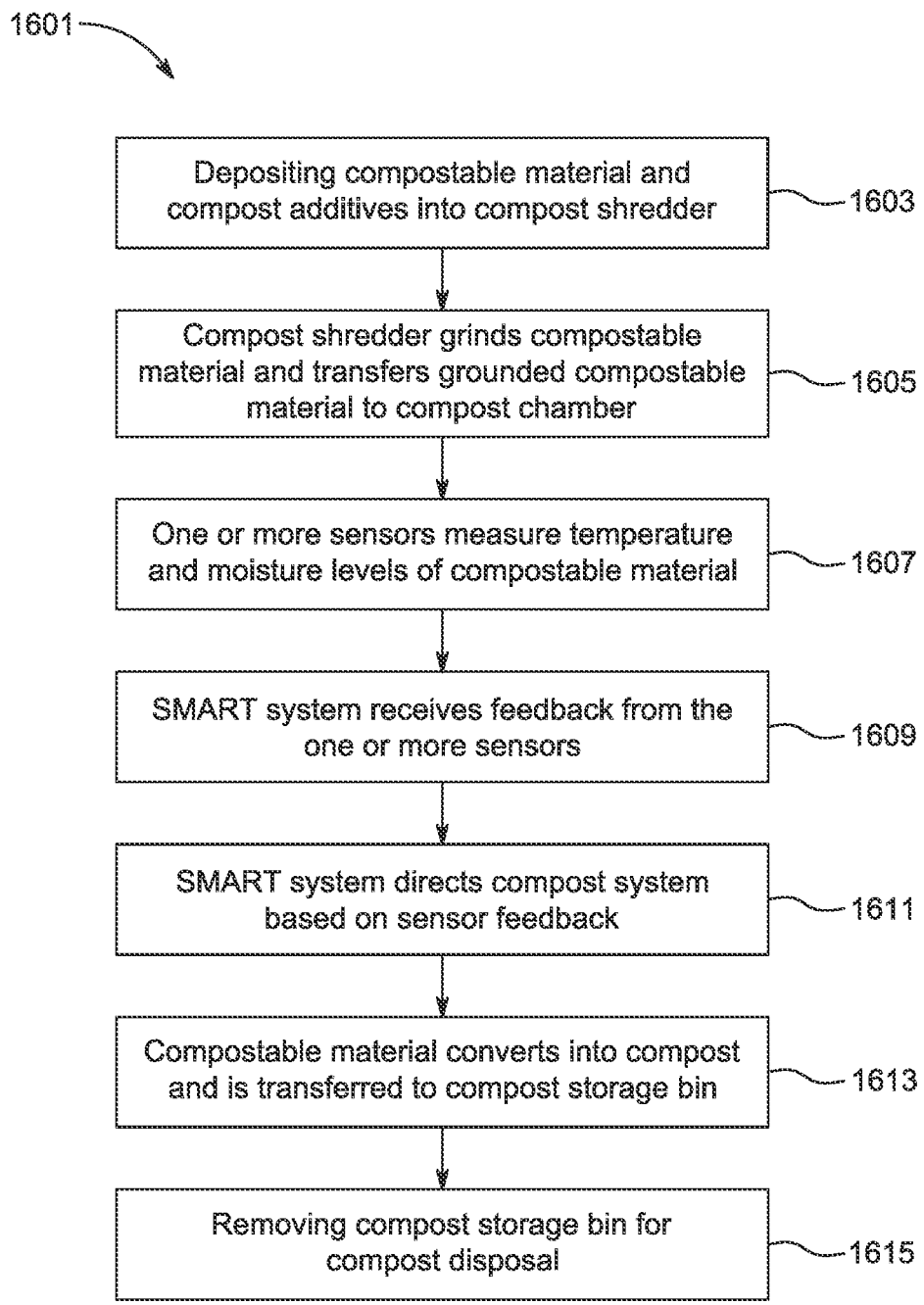
FIG. 16 is a flowchart of a method of use of the compost system of FIG. 15.

In FIG. 16, a flowchart 1601 depicts a simplified method of use associated with the compost system 1501. During use, the user deposits compostable material and compost additives into the compost shredder, as shown with box 1603. The compost shredder then grinds the compostable material and transfers the grounded compostable material to the compost chamber, as shown with box 1605. The one or more sensors measure the temperature and moisture levels of the compostable material, as shown with box 1607. The SMART system receives feedback from the one or more sensors and directs the compost system based on sensor feedback, as shown with boxes 1609, 1611. Once the compostable material converts into compost, the compost is transferred to the compost storage bin for the user to remove for compost disposal, as shown with boxes 1613, 1615.

Figure 17:
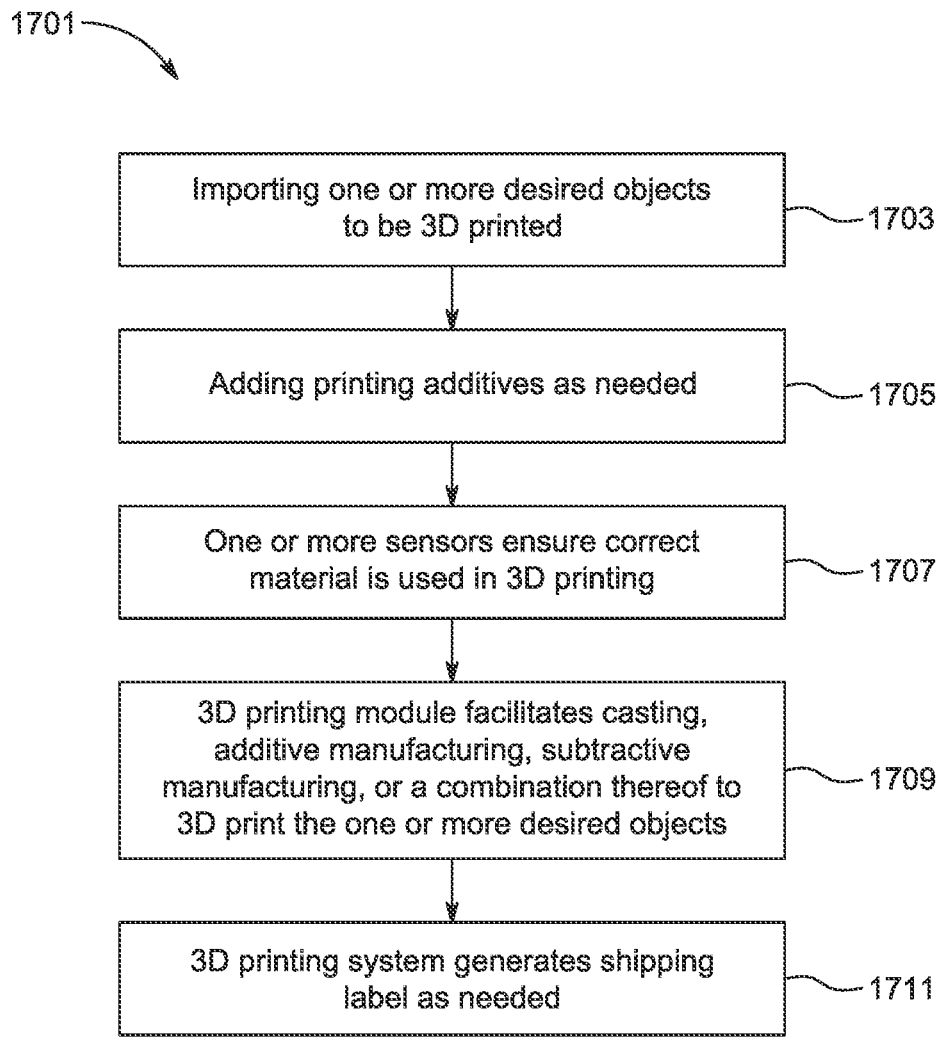
FIG. 17 is a flowchart of a method of use of the three-dimensional (3D) printing system of FIG. 15.

In FIG. 17, a flowchart 1701 depicts a simplified method of use associated with the 3D printing system 1525. During use, the user imports one or more desired objects to be 3D printed, as shown with box 1703. The user may add printing additives as needed for 3D printing, as shown with box 1705. After the one or more sensors ensure the correct material is used for 3D printing, the 3D printing module facilitates casting, additive manufacturing, subtractive manufacturing, or a combination thereof to 3D print the one or more desired objects, as shown with box 1707, 1709. As needed, the 3D printing system generates a shipping label, as shown with box 1711.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A material size reducing and storage device system for facilitating recycling, comprising:
   a compost system for facilitating material size reduction of compostable material, the compost system having:
      a compost shredder;
      a compost chamber;
      a compost storage bin; and
      compost additives for accelerating compost process and time;
   wherein the compost shredder is configured to grind compostable material and deposit the grounded compostable material into the compost chamber;
   wherein the compost chamber is configured to facilitate composting of the compostable material; and
   a three-dimensional (3D) printing system in communication with the compost system and configured to facilitate 3D printing of one or more objects using material that have been reduced to a predetermined size from the compost storage bin, the 3D printing system having:
      a 3D printing module configured to facilitate casting, additive manufacturing, subtractive manufacturing, or a combination thereof to 3D print the one or more objects from compostable material from the compost system;
      one or more sensors configured to ensure that the correct material is used in 3D printing of the one or more objects; and
      printing additives for facilitating 3D printing of the one or more objects;
   wherein a feeder is configured to feed the compostable material from the compost system to the 3D printing system; and
   wherein the compost system and the 3D printing system are carried within an area formed by a housing.

2. The material size reducing and storage device system of claim 1, wherein the compost chamber further comprises:
   one or more sensors configured to temperature and moisture levels of the compostable material;
   one or more heating elements configured to facilitate further size reduction of compostable material by utilizing heating methods, wherein the heating methods include fuel-based, electricity-based, gas-based, and steam-based;
   one or more fans configured to facilitate air intake and air outflow for aeration and for capturing odor;
   one or more augers;
   one or more motors configured to drive the one or more augers; and
   one or more doors configured to control airflow within the compost chamber and configured to release compost into the compost storage bin.

* * * * *